(12) United States Patent
Wang et al.

(10) Patent No.: US 12,464,564 B2
(45) Date of Patent: Nov. 4, 2025

(54) COLLISION HANDLING OF CONFIGURED GRANT BASED AUTONOMOUS UPLINK TRANSMISSIONS

(71) Applicant: Telefonaktiebolaget LM Ericsson (publ), Stockholm (SE)

(72) Inventors: Min Wang, Luleå (SE); Mattias Bergström, Sollentuna (SE); Jan Christoffersson, Luleå (SE); Robert Karlsson, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 745 days.

(21) Appl. No.: 17/637,958

(22) PCT Filed: Jun. 24, 2020

(86) PCT No.: PCT/SE2020/050653
§ 371 (c)(1),
(2) Date: Feb. 24, 2022

(87) PCT Pub. No.: WO2021/040595
PCT Pub. Date: Mar. 4, 2021

(65) Prior Publication Data
US 2022/0295561 A1    Sep. 15, 2022

Related U.S. Application Data

(60) Provisional application No. 62/891,466, filed on Aug. 26, 2019.

(51) Int. Cl.
*H04W 74/08* (2024.01)
*H04W 72/04* (2023.01)
(Continued)

(52) U.S. Cl.
CPC ... *H04W 74/0816* (2013.01); *H04W 72/0446* (2013.01); *H04W 72/23* (2023.01);
(Continued)

(58) Field of Classification Search
CPC ... H04W 28/04; H04W 72/04; H04W 72/042; H04W 88/08; H04W 74/0816;
(Continued)

(56) References Cited

U.S. PATENT DOCUMENTS 11,627,605 B2 *   4/2023  Loehr ............... H04W 74/0808
                                                              370/329
11,637,658 B2 *   4/2023  Babaei .................. H04W 72/23
                                                              370/329
(Continued)

FOREIGN PATENT DOCUMENTS

EP      3482516 A1    5/2019
WO   WO 2015/116866 A1 *  8/2015  ............ H04W 52/34
(Continued)

OTHER PUBLICATIONS

3GPP TS 38.321 v15.4.0 (Dec. 2018), 3rd Generation Partnership Project; technical Specification Group Radio Access Network; NR; Medium Access Control (MAC) Protocol Specification (Release 15). (Year: 2018).*
(Continued)

*Primary Examiner* — Peter G Solinsky
*Assistant Examiner* — Sanjay K Dewan
(74) *Attorney, Agent, or Firm* — Sage Patent Group

(57) ABSTRACT

Embodiments include methods, performed by a user equipment (UE), for uplink (UL) transmission on a shared channel in a cell of a radio access network (RAN). Such methods include determining that the shared channel is unavailable for UL transmission of pending data during a first transmission opportunity. This determination can be based on per-
(Continued)

US 12,464,564 B2
Page 2 forming a listen-before-talk (LBT) procedure on the shared channel. Such methods include determining that further data for UL transmission is available before a second transmission opportunity that is after the first transmission opportunity, and determining whether the pending data or the further data should be prioritized for UL transmission during the second transmission opportunity. This prioritization determination can be based on various factors. Such methods can also include transmitting the pending data or the further data, during the second transmission opportunity, based on the prioritization determination. Other embodiments include UEs configured to perform such methods.

20 Claims, 10 Drawing Sheets

(51) Int. Cl.

| | | |
|---|---|---|
| *H04W 72/0446* | (2023.01) | |
| *H04W 72/12* | (2023.01) | |
| *H04W 72/14* | (2009.01) | |
| *H04W 72/23* | (2023.01) | |
| *H04W 72/543* | (2023.01) | |
| *H04W 72/566* | (2023.01) | |
| *H04W 74/0816* | (2024.01) | |

(52) U.S. Cl.
CPC ....... *H04W 72/543* (2023.01); *H04W 72/569* (2023.01); *H04W 74/0866* (2013.01)

(58) Field of Classification Search
CPC . H04W 72/569; H04W 72/543; H04W 72/23; H04W 72/0446; H04W 74/0866; H04W 72/14; H04W 72/1242; H04W 72/1236
USPC ........................................................ 370/329
See application file for complete search history.

(56) References Cited

U.S. PATENT DOCUMENTS

| | | | | |
|---|---|---|---|---|
| 11,646,832 | B2* | 5/2023 | Rastegardoost | H04L 1/1854 |
| | | | | 370/329 |
| 11,658,788 | B2* | 5/2023 | Cao | H04L 5/0055 |
| | | | | 370/329 |
| 11,671,981 | B2* | 6/2023 | Liu | H04W 76/14 |
| | | | | 370/329 |
| 11,742,989 | B2* | 8/2023 | Jeon | H04W 72/23 |
| | | | | 370/329 |
| 11,751,251 | B2* | 9/2023 | Li | H04W 74/0808 |
| | | | | 370/329 |
| 2012/0300733 | A1* | 11/2012 | Pelletier | H04L 1/1822 |
| | | | | 370/329 |
| 2014/0293883 | A1* | 10/2014 | Wang | H04L 5/0055 |
| | | | | 370/329 |
| 2015/0103752 | A1* | 4/2015 | Yu | H04L 49/9005 |
| | | | | 370/329 |
| 2018/0270807 | A1* | 9/2018 | Salem | H04W 72/0446 |
| 2019/0045503 | A1* | 2/2019 | Faronius | H04W 72/1263 |
| 2019/0150184 | A1* | 5/2019 | Golitschek Edler von Elbwart ... H04L 1/1887 |
| | | | | 370/329 |
| 2019/0289661 | A1* | 9/2019 | Chen | H04W 24/10 |
| 2020/0220693 | A1* | 7/2020 | Babaei | H04L 5/0044 |
| 2020/0260486 | A1* | 8/2020 | Zhou | H04L 1/1835 |
| 2021/0007149 | A1* | 1/2021 | Li | H04W 74/0833 |
| 2021/0105104 | A1* | 4/2021 | Cao | H04L 1/1896 |
| 2021/0218503 | A1* | 7/2021 | Babaei | H04L 1/1861 |
| 2022/0225412 | A1* | 7/2022 | Tooher | H04W 72/0453 |
| 2023/0328713 | A1* | 10/2023 | Guo | H04W 74/0816 |
| | | | | 370/329 |

FOREIGN PATENT DOCUMENTS

| | | | | |
|---|---|---|---|---|
| WO | WO 2016/123402 A1 * | 8/2016 | | H04L 5/00 |
| WO | WO 2017/136678 A1 * | 8/2017 | | H04L 1/18 |
| WO | WO 2018/013449 A1 * | 1/2018 | | H04L 1/18 |
| WO | WO 2020/194258 A1 * | 1/2020 | | H04L 5/00 |
| WO | WO 2020/032975 A1 * | 2/2020 | | H04W 74/08 |
| WO | WO 2020/033623 A1 * | 2/2020 | | H04L 1/18 |
| WO | WO 2020/168223 A1 * | 8/2020 | | H04W 72/04 |
| WO | WO 2020/198317 A1 * | 10/2020 | | H04W 72/12 |
| WO | WO 2020/223420 A1 * | 11/2020 | | H04L 1/18 |
| WO | WO 2020/223687 A1 * | 11/2020 | | H04W 74/00 |
| WO | WO 2021/013811 A1 * | 1/2021 | | H04W 72/04 |
| WO | WO 2021/025674 A1 * | 2/2021 | | H04L 1/18 |

OTHER PUBLICATIONS

3GPP TS 38.321 v15.4.0 (Dec. 2018), Technical Specification, 3rd Generation Partnership Project; Technical Specification Group Radio Access Network; NR; Medium Access Control (MAC) protocol specification (Release 15). (Year: 2018).*
International Search Report and Written Opinion of the International Searching Authority for PCT International Application No. PCT/SE2020/050653 dated Sep. 2, 2020.
3GPP TR 38.889 V16.0.0, "3rd Generation Partnership Project; Technical Specification Group Radio Access Network; Study on NR-based access to unlicensed spectrum (Release 16)," Dec. 2018, 119 pages.
3GPP TS 36.331 V15.6.0, "3rd Generation Partnership Project; Technical Specification Group Radio Access Network; Evolved Universal Terrestrial Radio Access (E-UTRA); Radio Resource Control (RRC); Protocol specification (Release 15)," Jun. 2019, 960 pages.
3GPP TS 38.211 V15.6.0, "3rd Generation Partnership Project; Technical Specification Group Radio Access Network; NR; Physical channels and modulation (Release 15)," Jun. 2019, 97 pages.
3GPP TS 38.214 V15.0.0, "3rd Generation Partnership Project; Technical Specification Group Radio Access Network; NR; Physical layer procedures for data (Release 15)," Dec. 2017, 71 pages.
3GPP TS 38.321 V15.4.0, "3rd Generation Partnership Project; Technical Specification Group Radio Access Network; NR; Medium Access Control (MAC) protocol specification (Release 15)," Dec. 2018, 77 pages.
3GPP TS 38.331 V15.6.0, "3rd Generation Partnership Project; Technical Specification Group Radio Access Network; NR; Radio Resource Control (RRC) protocol specification (Release 15)," Jun. 2019, 519 pages.
3GPP TR 38.801 V14.0.0, "3rd Generation Partnership Project; Technical Specification Group Radio Access Network; Study on new radio access technology: Radio access architecture and interfaces (Release 14)," Mar. 2017, 91 pages.
3GPP TS 38.401 V15.6.0, "3rd Generation Partnership Project; Technical Specification Group Radio Access Network; NG-RAN; Architecture description (Release 15)," Jul. 2019, 46 pages.

* cited by examiner

```
ConfiguredGrantConfig ::=    SEQUENCE {
    frequencyHopping            ENUMERATED {intraSlot, interSlot}            OPTIONAL,    -- Need S,
    cg-DMRS-Configuration       DMRS-UplinkConfig,
    mcs-Table                   ENUMERATED {qam256, qam64LowSE}              OPTIONAL,    -- Need S
    mcs-TableTransformPrecoder  ENUMERATED {qam256, qam64LowSE}              OPTIONAL,    -- Need S
    uci-OnPUSCH                 SetupRelease { CG-UCI-OnPUSCH }              OPTIONAL,    -- Need M
    resourceAllocation          ENUMERATED { resourceAllocationType0, resourceAllocationType1, dynamicSwitch },
    rbg-Size                    ENUMERATED {config2}                         OPTIONAL,    -- Need S
    powerControlLoopToUse       ENUMERATED {n0, n1},
    p0-PUSCH-AlphaSetId         P0-PUSCH-AlphaSetId,
    transformPrecoder           ENUMERATED {enabled, disabled}               OPTIONAL,    -- Need S
    nrofHARQ-Processes          INTEGER(1..16),
    repK                        ENUMERATED {n1, n2, n4, n8},
    repK-RV                     ENUMERATED {s1-0231, s2-0303, s3-0000}       OPTIONAL,    -- Need R
    periodicity                 ENUMERATED {
        sym2, sym7, sym1x14, sym2x14, sym4x14, sym5x14, sym8x14, sym10x14, sym16x14, sym20x14,
        sym32x14, sym40x14, sym64x14, sym80x14, sym128x14, sym160x14, sym256x14, sym320x14, sym512x14,
        sym640x14, sym1024x14, sym1280x14, sym2560x14, sym5120x14, sym6, sym1x12, sym2x12, sym4x12,
        sym5x12, sym8x12, sym10x12, sym16x12, sym20x12, sym32x12, sym40x12, sym64x12, sym80x12,
        sym128x12, sym160x12, sym256x12, sym320x12, sym512x12, sym640x12, sym1280x12, sym2560x12
    },
    configuredGrantTimer        INTEGER (1..64)                              OPTIONAL,    -- Need R
    rrc-ConfiguredUplinkGrant   SEQUENCE {
        timeDomainOffset                 INTEGER (0..5119),
        timeDomainAllocation             INTEGER (0..15),
        frequencyDomainAllocation        BIT STRING (SIZE(18)),
        antennaPort                      INTEGER (0..31),
        dmrs-SeqInitialization           INTEGER (0..1)                      OPTIONAL,    -- Need R
        precodingAndNumberOfLayers       INTEGER (0..63),
        srs-ResourceIndicator            INTEGER (0..15)                     OPTIONAL,    -- Need R
        mcsAndTBS                        INTEGER (0..31),
        frequencyHoppingOffset           INTEGER (1.. maxNrofPhysicalResourceBlocks-1)  OPTIONAL,    -- Need R
        pathlossReferenceIndex           INTEGER (0.. maxNrofPUSCH-PathlossReferenceRSs-1),
        ...
    }
    ...
}
```

FIG. 9

COLLISION HANDLING OF CONFIGURED GRANT BASED AUTONOMOUS UPLINK TRANSMISSIONS

CROSS REFERENCE TO RELATED APPLICATIONS

This application is a 35 U.S.C. § 371 national stage application of PCT International Application No. PCT/SE2020/050653 filed on Jun. 24, 2020, which claims the benefit of U.S. Provisional Patent Application Ser. No. 62/891,466, filed on Aug. 26, 2019, the disclosures and content of which are incorporated by reference herein in their entireties.

TECHNICAL FIELD

The present invention generally relates to wireless communication networks, and particularly relates to improvements to uplink transmissions (e.g., from wireless device to wireless network) in unlicensed or shared spectrum.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. The present disclosure relates generally to NR, but the following description of Long-Term Evolution (LTE) technology is provided for context since it shares many features with NR.

LTE is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

3GPP LTE Rel-10 supports bandwidths larger than 20 MHz. One important Rel-10 requirement is backward compatibility with LTE Rel-8, including spectrum compatibility. As such, a wideband LTE Rel-10 carrier (e.g., wider than 20 MHz) should appear as a plurality of carriers ("component carriers" or CCs) to an LTE Rel-8 ("legacy") terminal. Legacy terminals can be scheduled in all parts of the wideband LTE Rel-10 carrier. One way to achieve this is by Carrier Aggregation (CA), whereby a Rel-10 terminal can receives multiple CCs, each preferably having the same structure as a Rel-8 carrier. Additionally, LTE Rel-12 introduced dual connectivity (DC) whereby a UE can be connected to two network nodes simultaneously, thereby improving connection robustness and/or capacity.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 116 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface, labelled "Radio") and S1 (E-UTRAN/EPC interface), each using a specific set of protocols, i.e., Radio Protocols and S1 Protocols.

FIG. 2B illustrates a block diagram of an exemplary Control (C)-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel on PDCCH for pages from the EPC via eNB. A UE in RRC_IDLE state is known in the EPC and has an assigned IP address, but is not known to the serving eNB (e.g., there is no stored context).

Logical channel communications between a UE and an eNB are via radio bearers. Since LTE Rel-8, signaling radio bearers (SRBs) SRB0, SRB1, and SRB2 have been available for the transport of RRC and NAS messages. SRB0 is used for RRC connection setup, RRC connection resume, and RRC connection re-establishment. Once any of these operations has succeeded, SRB1 is used for handling RRC messages (which may include a piggybacked NAS message) and for NAS messages prior to establishment of SRB2. SRB2 is used for NAS messages and lower-priority RRC messages (e.g., logged measurement information). SRB0 and SRB1 are also used for establishment and modification of data radio bearers (DRBs) for carrying user data between the UE and eNB.

The multiple access scheme for the LTE PHY is based on Orthogonal Frequency Division Multiplexing (OFDM) with a cyclic prefix (CP) in the downlink, and on Single-Carrier Frequency Division Multiple Access (SC-TDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 slots, numbered 0 through 19, each with a fixed duration of 0.5 ms. A 1-ms subframe comprises two consecutive slots where subframe i consists of slots 2i and 2i+1. Each exemplary DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description. An exemplary uplink slot can be configured in similar manner as discussed above, but comprising $N^{UL}_{symb}$ OFDM symbols, each of which includes $N_{sc}$ subcarriers.

A combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RC}_{sc}$ subcarriers over the duration of a slot (i.e., $N^{DL}_{symb}$ symbols), where $N^{RB}_{sc}$ is typically either 12 (with a 15-kHz SCS) or 24 (7.5-kHz SCS). The configuration of 15-kHz SCS and "normal" CP is often referred to as the numerology, μ.

In general, an LTE physical channel corresponds to a set of REs carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals (e.g., channel state information reference signals, CSI-RS), synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI) including scheduling information for DL messages on PDSCH, grants for UL transmission on PUSCH, and channel quality feedback (e.g., CSI) for the UL channel PHICH carries HARQ feedback (e.g., ACK/NAK) for UL transmissions by the UEs.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PUSCH is the uplink counterpart to the PDSCH. PUCCH is used by UEs to transmit uplink control information (UCI) including HARQ feedback for eNB DL transmissions, channel quality feedback (e.g., CSI) for the DL channel, scheduling requests (SRs), etc. PRACH is used for random access preamble transmission.

Within the LTE DL, certain REs within each LTE subframe are reserved for the transmission of reference signals, such as DM-RS mentioned above. Other DL reference signals include cell-specific reference signals (CRS), positioning reference signals (PRS), and CSI reference signals (CSI-RS). UL reference signals include DM-RS and SRS mentioned above. Other RS-like DL signals include Primary Synchronization Sequence (PSS) and Secondary Synchronization Sequence (SSS), which facilitate the UEs time and frequency synchronization and acquisition of system parameters (e.g., via PBCH).

In LTE, UL and DL data transmissions (e.g., on PUSCH and PDSCH, respectively) can take place with or without an explicit grant or assignment of resources by the network (e.g., eNB). In general, UL transmissions are usually referred to as being "granted" by the network (i.e., "UL grant"), while DL transmissions are usually referred to as taking place on resources that are "assigned" by the network (i.e., "DL assignment").

In case of a transmission based on an explicit grant/assignment, downlink control information (DCI) is sent to the UE informing it of specific radio resources to be used for the transmission. In contrast, a transmission without an explicit grant/assignment is typically configured to occur with a defined periodicity. Given a periodic and/or recurring UL grant and/or DL assignment, the UE can then initiate a data transmission and/or receive data according to a predefined configuration. Such transmissions can be referred to as semi-persistent scheduling (SPS), configured grant (CG), or grant-free transmissions.

The fifth generation (5G) NR technology shares many similarities with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL.

As another example, in the time domain, NR DL and UL physical resources are organized into equal-sized 1-ms subframes. A subframe is further divided into multiple slots of equal duration, with each slot including multiple OFDM-based symbols. As another example, NR RRC layer includes RRC_IDLE and RRC_CONNECTED states, but adds an additional state known as RRC_INACTIVE, which has some properties similar to a "suspended" condition used in LTE.

In addition to providing coverage via "cells," as in LTE, NR networks also provide coverage via "beams." In general, a DL "beam" is a coverage area of a network-transmitted RS that may be measured or monitored by a UE. In NR, for example, such RS can include any of the following, alone or in combination: SS/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

Furthermore, time-frequency resources can be configured much more flexibly for an NR cell than for an LTE cell. For example, rather than a fixed 15-kHz SCS as in LTE, NR SCS can range from 15 to 240 kHz, with even greater SCS considered for future NR releases.

NR also targets both licensed and unlicensed bands, and a work item named NR-based Access to Unlicensed Spectrum (NR-U) was started in January 2019. Allowing unlicensed networks (i.e., networks that operate in spectrum not licensed to the operator such that it must be shared) to effectively use available spectrum is an attractive approach to increase system capacity. Although unlicensed spectrum does not match the quality of licensed (e.g., unshared) spectrum, solutions that allow an efficient use of it as a complement to licensed deployments have the potential to bring great value to the 3GPP operators, and, ultimately, to the 3GPP industry as a whole. It is expected that some features in NR will need to be adapted to comply with the special characteristics of the unlicensed band as well as also different regulations.

In NR-U, both configured scheduling and dynamic scheduling will be used. In NR, configured scheduling is used to allocate semi-static periodic assignments or grants for a UE. For NR UL, there are two types of configured scheduling schemes: Type 1 and Type 2. Type-1 configured grants are configured via RRC signaling only, while for Type-2, some parameters are preconfigured via RRC signaling and some PHY parameters are configured via MAC scheduling. The detail procedures can be found in 3GPP TS 38.321 V15.4.0. The RRC configuration of a UL configured grant includes various parameters, including a configuredGrantTimer value that is used for controlling operation of hybrid ARQ (HARQ) processes in the UL via a controlled grant timer ("CG timer") in the UE.

Autonomous Uplink (AUL) is also being developed for NR Rel-16, based on the configured UL scheduling scheme in Rel-15. AUL is intended to support autonomous HARQ retransmission using a configured grant. In this arrangement, a new UE timer (referred to as "CG retransmission timer") is needed to protect the HARQ procedure so that the same HARQ process can be used for both transmission and retransmission of a transport block (TB) of UL data.

However, the CG timer and the CG retransmission timer can be started only when a TB is actually transmitted using a configured grant. This can cause various issues, problems, and/or drawbacks for NR-U scenarios, particularly when a TB cannot be transmitted due to a shared channel in unlicensed spectrum being busy or occupied.

SUMMARY

Embodiments of the present disclosure provide specific improvements to communication between user equipment (UE) and network nodes in a wireless communication network, such as by facilitating solutions to overcome the exemplary problems summarized above and described in more detail below.

Some exemplary embodiments of the present disclosure include methods (e.g., procedures) for uplink (UL) transmission on a shared channel within a cell of a radio access network (RAN). These exemplary methods can be performed by a user equipment (UE, e.g., wireless device, IoT device, modem, etc. or component thereof) in communication with a network node (e.g., base station, eNB, gNB, etc., or components thereof) configured to serve the cell in the RAN (e.g., E-UTRAN, NG-RAN).

These exemplary methods can include determining that the shared channel is unavailable for UL transmission of pending data during a first transmission opportunity. In some embodiments, determining that the shared channel is unavailable can include performing a listen-before-talk (LBT) procedure on the shared channel In such embodiments, the pending data can be pending due a previous determination, by a previous LBT procedure, that the shared channel was unavailable for UL transmission during a previous transmission opportunity before the first transmission opportunity.

These exemplary methods can also include determining that further data for UL transmission is available before a second transmission opportunity that is after the first transmission opportunity. In some embodiments, these operations can include determining that the further data is available after the first transmission opportunity (e.g., the further data arrives after the first transmission opportunity).

In some embodiments, these exemplary methods can also include receiving, from a network node serving the cell, a configured UL grant of resources associated with the shared channel. The configured UL grant can be applicable for a plurality of transmission opportunities during which UL transmission by the UE is permitted on the shared channel The plurality of transmission opportunities can include the first and second transmission opportunities. In some embodiments, the shared channel can be a PUSCH. For example, the UE can receive the configured UL grant via DCI over PDCCH or RRC signaling over PDSCH.

These exemplary methods can also include determining whether the pending data or the further data should be prioritized for UL transmission during the second transmission opportunity. In some embodiments, this operation can be based on any of the following:

- logical channel priorities associated with the pending data and with the further data;
- service types associated with the pending data and with the further data;
- quality of service (QoS) requirements associated with the pending data and with the further data;
- an amount of time that the pending data has been queued by the UE;
- a predetermined rule prioritizing data pending before an LBT determination that the shared channel is unavailable; and
- a predetermined rule prioritizing data received after an LBT determination that the shared channel is unavailable.

In some embodiments, determining whether the pending data or the further data should be prioritized can include determining that the further data should be prioritized based on an amount of time that the pending data has been queued by the UE being one of the following:

- less than or equal to a first threshold, such that the pending data will meet its associated QoS requirements even if the further data is prioritized; or
- greater than a second threshold, such that the pending data will not meet its associated QoS requirements even if it is prioritized.

In some embodiments, determining whether the pending data or the further data should be prioritized can include determining that the pending data should be prioritized based on an amount of time that the pending data has been queued by the UE being greater than a third threshold, such that the pending data must be prioritized to meet its QoS requirements.

In some embodiments, determining whether the pending data or the further data should be prioritized can include determining whether the further data was received less than a predetermined duration before the second transmission opportunity. This predetermined duration can be associated with an amount of time needed by the UE to prepare a transport block (TB) containing the further data (e.g., UE processing delays). In some of these embodiments, when the further data is received less than the predetermined duration before the second transmission opportunity, the pending data can be prioritized regardless of other reasons for prioritizing the further data.

In some embodiments, determining whether the pending data or the further data should be prioritized can include determining availability of any hybrid ARQ (HARQ) buffer that does not contain data awaiting retransmission, for storing the further data for UL transmission. In some of these embodiments, when no HARQ buffers that do not contain data awaiting retransmission determined to be are available, the pending data can be prioritized regardless of other reasons for prioritizing the further data.

In some embodiments, these exemplary methods can also include storing the pending data as a first transport block (TB) in a first hybrid ARQ (HARQ) buffer and storing the further data as a second TB in a second HARQ buffer. In some of these embodiments, the second HARQ buffer can be associated with a different HARQ process than the first HARQ buffer. In other of these embodiments, the second HARQ buffer is the first HARQ buffer and these exemplary methods can also include, based on the determination of prioritization, selectively reordering the first TB and the second TB in the first HARQ buffer.

In some embodiments, these exemplary methods can also include, based on the determination of prioritization, transmitting the pending data or the further data during the second transmission opportunity. In some of these embodiments, transmitting the pending data or the further data can also be based on determining that the shared channel is available for UL transmission during the second transmission opportunity. In some embodiments, these exemplary methods can also include, when the further data is transmitted during the second transmission opportunity, discarding the pending data and triggering an upper-layer retransmission procedure for the pending data.

Other embodiments include user equipment (UEs, e.g., wireless devices, IoT devices, etc. or component(s) thereof) configured to perform operations corresponding to any of the exemplary methods described herein. Other embodiments include non-transitory, computer-readable media storing program instructions that, when executed by processing circuitry, configure such UEs to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 7, which includes

FIG. 8, which includes

FIG. 9 shows an exemplary ASN.1 data structure for a ConfiguredGrantConfig information element (IE) used for radio resource control (RRC) configuration of NR UEs.

DETAILED DESCRIPTION

Figure 1:
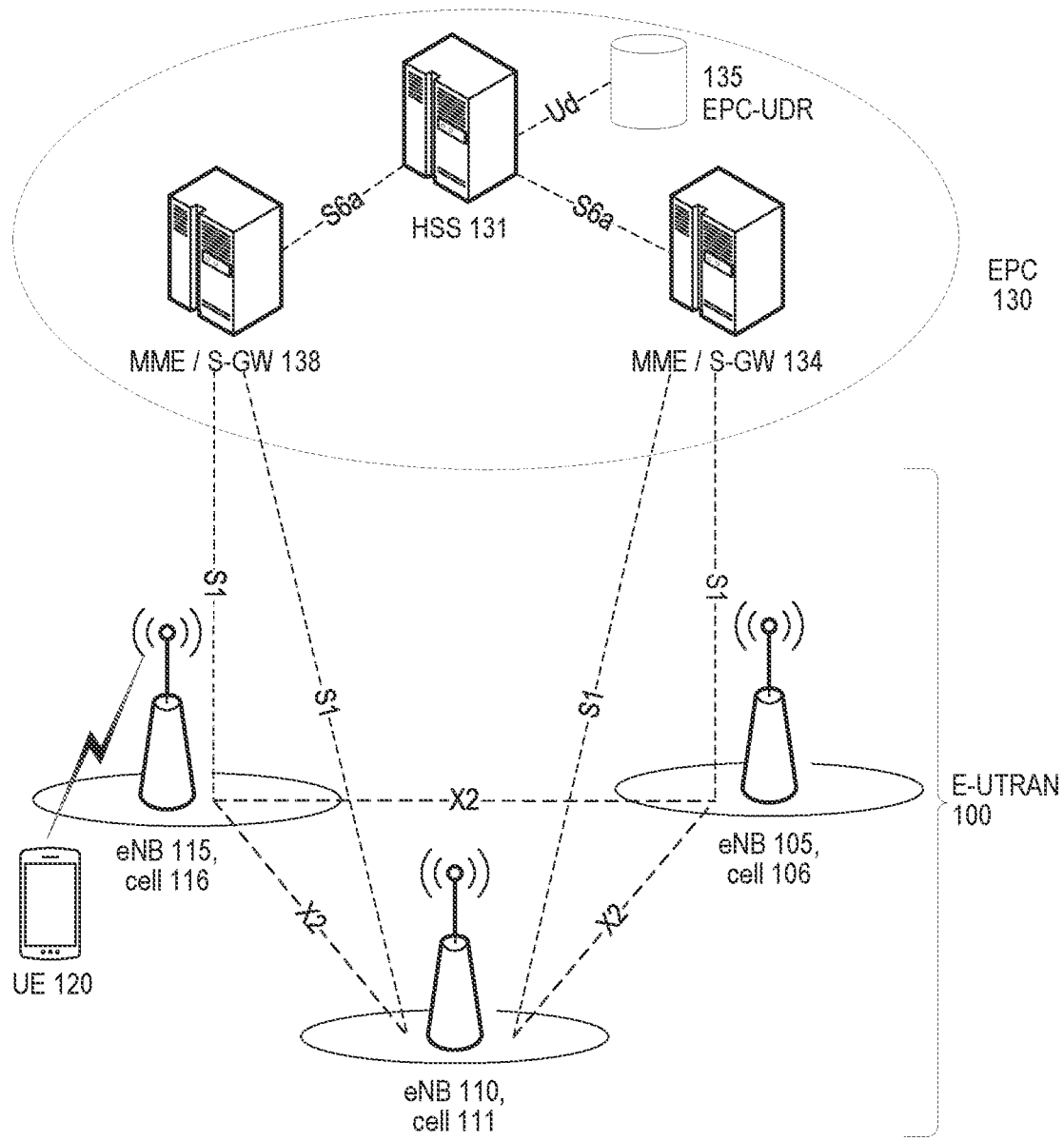
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
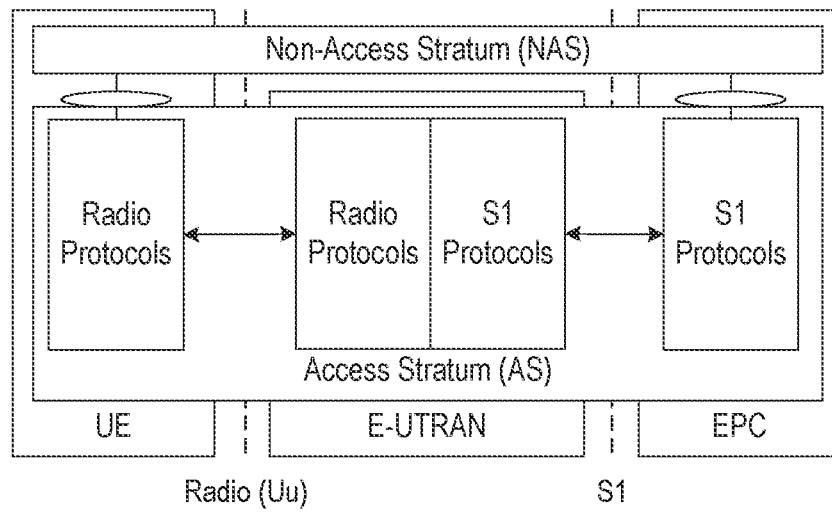
FIG. 2A is a high-level block diagram of an exemplary E-UTRAN architecture in terms of its constituent components, protocols, and interfaces.
Figure 2B:
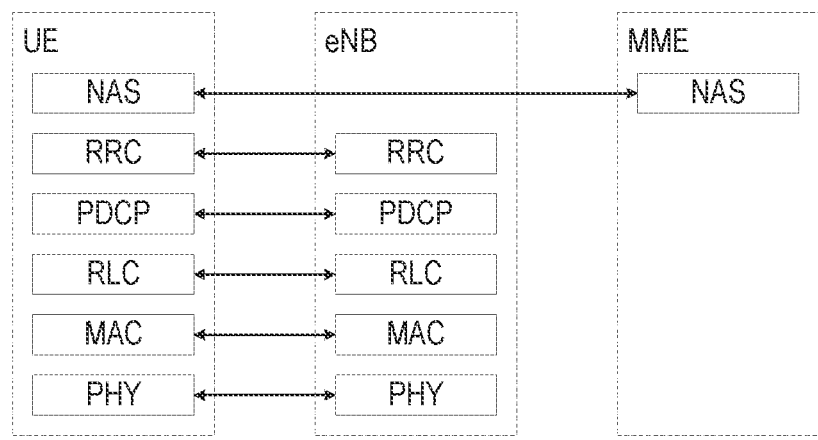
FIG. 2B is a block diagram of exemplary protocol layers of the control-plane portion of the radio (Uu) interface between a user equipment (UE) and the E-UTRAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network. Note that the description herein focuses on a 3GPP cellular communications system and, as such, 3GPP terminology or terminology similar to 3GPP terminology is oftentimes used.

However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

For a node to be allowed to transmit in unlicensed spectrum, it typically needs to perform a listen-before-talk (LBT) or a clear channel assessment (CCA). For example, in the 5 GHz band, the sensing is done over 20-MHz channels. This procedure can include sensing the medium as idle for a number of time intervals, which can be done in various ways including energy detection, preamble detection, or virtual carrier sensing.

In virtual carrier sensing, the node reads control information from other transmitting nodes informing when a transmission ends. After sensing the medium idle, a node is typically allowed to transmit for a certain amount of time, referred to as transmission opportunity (TXOP). The length of the TXOP depends on regulation and type of CCA that has been performed, but typically ranges from 1 ms to 10 ms.

In the energy detection (ED) technique used in NR-U, the transmitter looks for the energy level in channel over a time period compared to a certain threshold (ED threshold) in order to determine if the channel is idle or occupied/busy. If the channel is determined to be occupied, the transmitter performs a random back-off within a contention window before next CCA attempt. In order to protect the ACK transmissions, the transmitter must defer a period after each busy CCA slot prior to resuming back-off. As soon as the transmitter has grasped access to a channel, the transmitter is only allowed to perform transmission up to a maximum time duration (i.e., maximum channel occupancy time, MCOT). For quality of service (QoS) differentiation, a channel access priority based on the service type has been defined. For example, four LBT priority classes are defined for differentiation of contention window sizes (CWS) and MCOT between services.

As briefly mentioned above, the use of configured UL grants in NR-U can introduce various issues, problems, and/or drawbacks, particularly in the event of a shared channel in unlicensed spectrum being busy or occupied (e.g., as detected by an LBT procedure). This is discussed in more detail below, after the following description of NR network architectures and radio interface.

Figure 3:
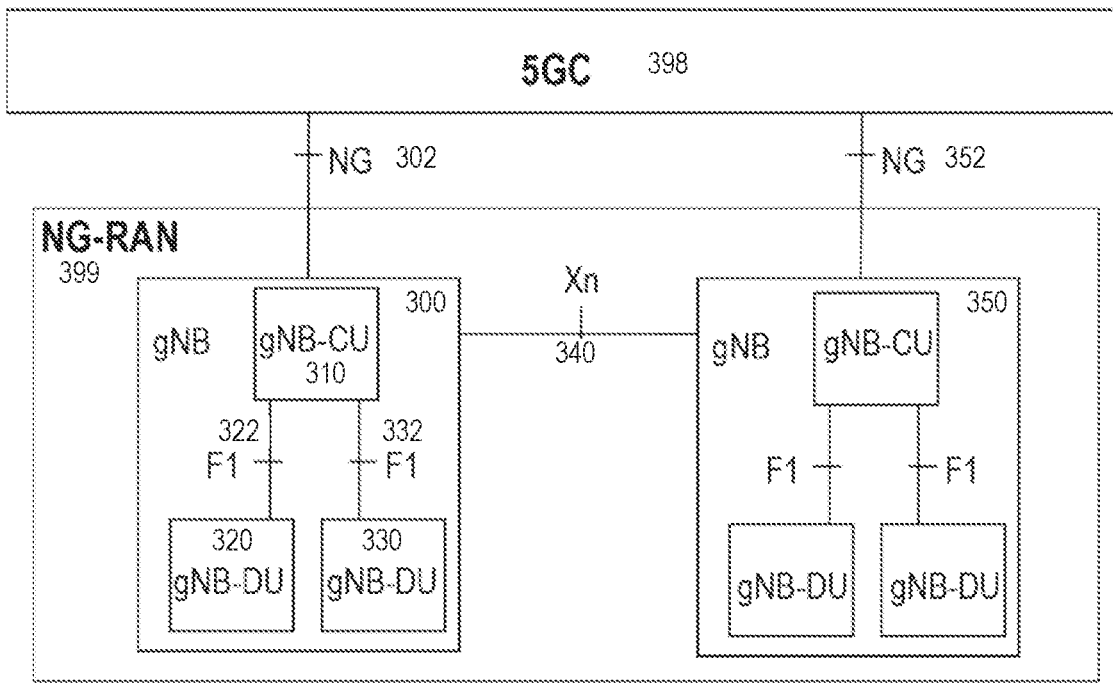
FIGS. 3-4 illustrate two high-level views of an exemplary 5G network architecture.

FIG. 3 illustrates a high-level view of the 5G network architecture, consisting of a Next Generation RAN (NG-RAN) 399 and a 5G Core (5GC) 398. NG-RAN 399 can include a set of gNodeB's (gNBs) connected to the 5GC via one or more NG interfaces, such as gNBs 300, 350 connected via interfaces 302, 352, respectively. In addition, the gNBs can be connected to each other via one or more Xn interfaces, such as Xn interface 340 between gNBs 300 and 350. With respect the NR interface to UEs, each of the gNBs can support frequency division duplexing (FDD), time division duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP shall be applied.

The NG RAN logical nodes shown in FIG. 3 (and described in 3GPP TS 38.301 and 3GPP TR 38.801) include a central (or centralized) unit (CU or gNB-CU) and one or more distributed (or decentralized) units (DU or gNB-DU). For example, gNB 300 includes gNB-CU 310 and gNB-DUs 320 and 340. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB. In other words, the F1 interface is not visible beyond gNB-CU.

Figure 4:
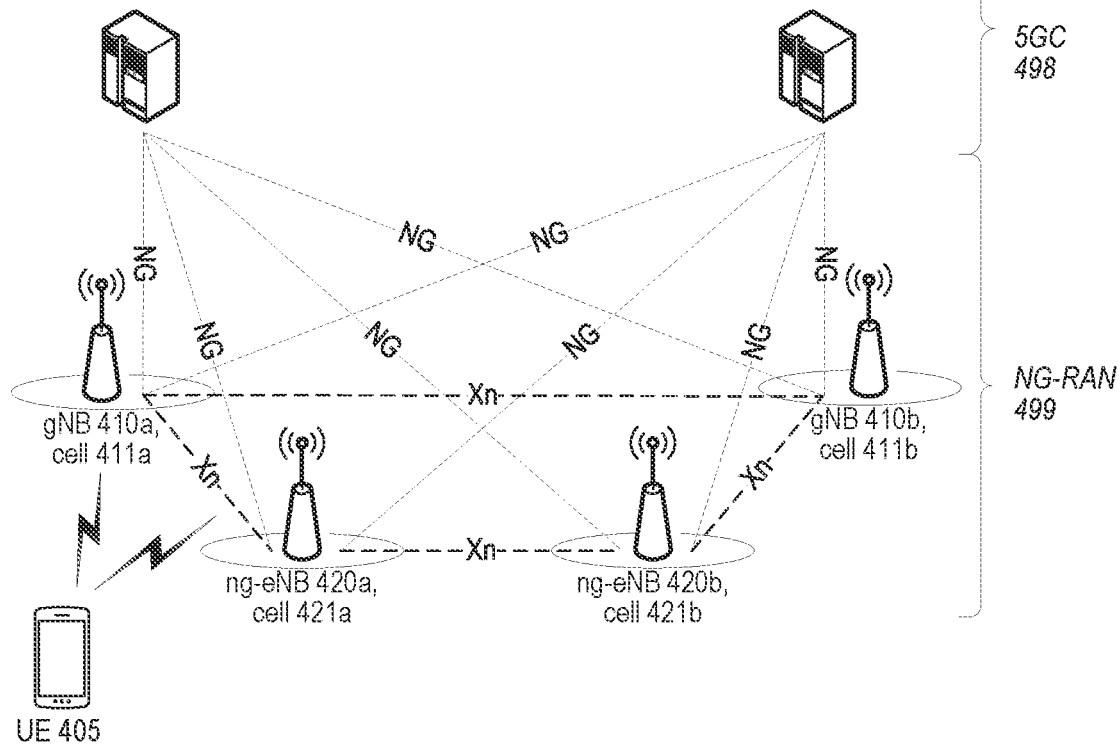

FIG. 4 shows a high-level view of an exemplary 5G network architecture, including a Next Generation Radio Access Network (NG-RAN) 499 and a 5G Core (5GC) 498. As shown in the figure, NG-RAN 499 can include gNBs 410 (e.g., 410a,b) and ng-eNBs 420 (e.g., 420a,b) that are interconnected with each other via respective Xn interfaces. The gNBs and ng-eNBs are also connected via the NG interfaces to 5GC 498, more specifically to the AMF (Access and Mobility Management Function) 430 (e.g., AMFs 430a, b) via respective NG-C interfaces and to the UPF (User Plane Function) 440 (e.g., UPFs 440a,b) via respective NG-U interfaces. Moreover, the AMFs 430a,b can communicate with one or more policy control functions (PCFs, e.g., PCFs 450a,b) and network exposure functions (NEFs, e.g., NEFs 460a,b).

Each of the gNBs 410 can support the NR radio interface including frequency division duplexing (FDD), time division duplexing (TDD), or a combination thereof. In contrast, each of ng-eNBs 420 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 411a-b and 421a-b shown as exemplary in FIG. 4. As mentioned above, the gNBs and ng-eNBs can also use various directional beams to provide coverage in the respective cells. Depending on the particular cell in which it is located, a UE 405 can communicate with the gNB or ng-eNB serving that particular cell via the NR or LTE radio interface, respectively.

Figure 5:
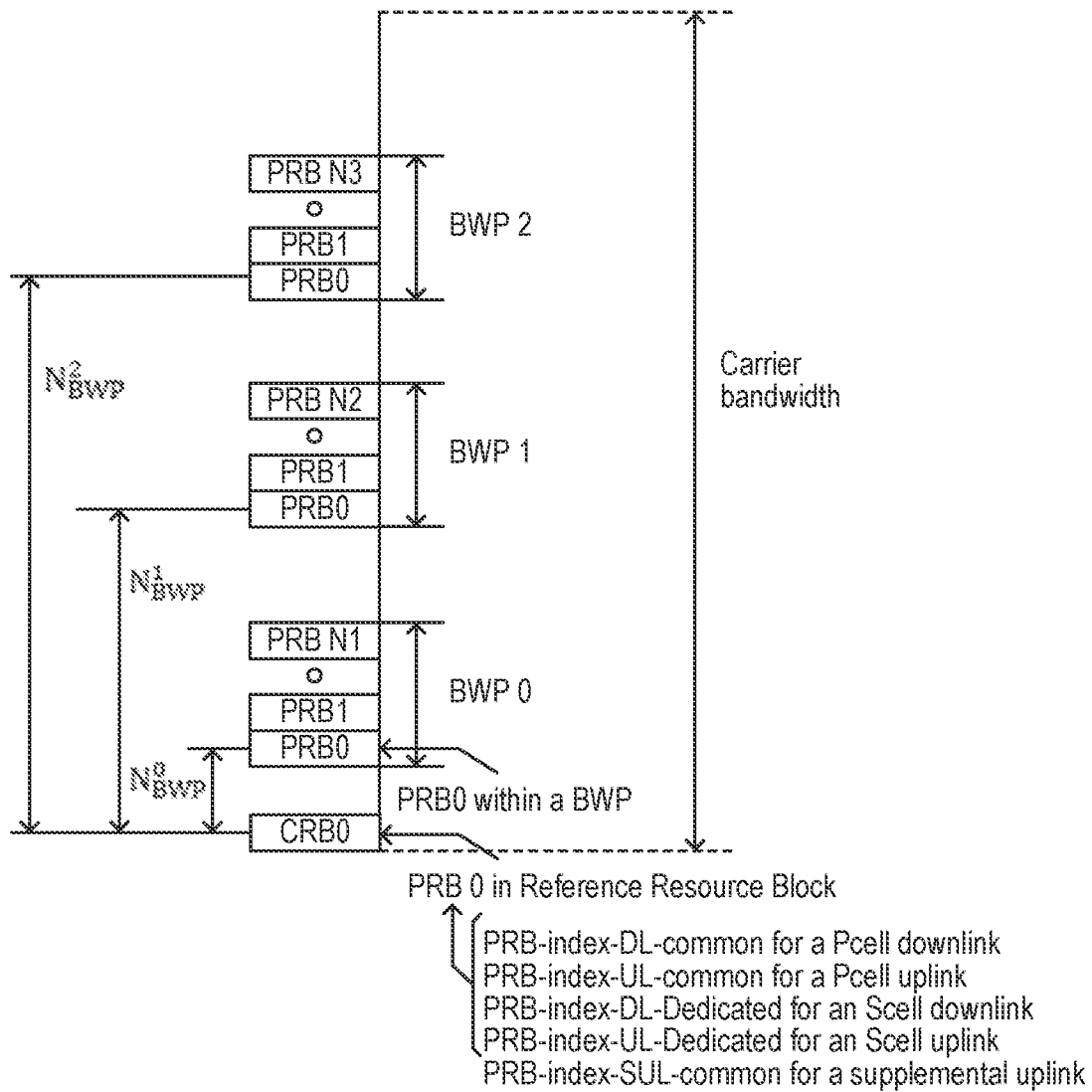
FIG. 5 shows an exemplary frequency-domain configuration for a 5G/NR UE.

FIG. 5 shows an exemplary frequency-domain configuration for an NR UE. In Ra-15 NR, a UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time. In the exemplary arrangement of FIG. 5, the UE is configured with three DL (or UL) BWPs, labelled BWP 0-2, respectively.

Common RBs (CRBs) are numbered from 0 to the end of the carrier bandwidth. Each BWP configured for a UE has a common reference of CRB0 (as shown in FIG. 5), such that a configured BWP may start at a CRB greater than zero. CRB0 can be identified by one of the following parameters provided by the network, as further defined in 3GPP TS 38.211 section 4.4:

PRB-index-DL-common for DL in a primary cell (PCell, e.g., PCell or PSCell);
PRB-index-UL-common for UL in a PCell;
PRB-index-DL-Dedicated for DL in a secondary cell (SCell);
PRB-index-UL-Dedicated for UL in an SCell; and
PRB-index-SUL-common for a supplementary UL.

In this manner, a UE can be configured with a narrow BWP (e.g., 10 MHz) and a wide BWP (e.g., 100 MHz), each starting at a particular CRB, but only one BWP can be active for the UE at a given point in time. In the arrangement shown in FIG. 5, BWPs 0-2 start at CRBs $N^0_{BWP}$, $N^1_{BWP}$, and $N^2_{BWP}$, respectively. Within a BWP, PRBs are defined and numbered in the frequency domain from 0 to $NB^{size}_{BWPi}-1$, where i is the index of the particular BWP for the carrier. In the arrangement shown in FIG. 5, BWPs 0-2 include PRBs 0 to N1, N2, and N3, respectively.

Similar to LTE, each NR resource element (RE) corresponds to one OFDM subcarrier during one OFDM symbol interval. NR supports various SCS values $\Delta f=(15\times 2^{\mu})$ kHz, where $\mu \in (0,1,2,3,4)$ are referred to as "numerologies." Numerology $\mu=0$ (i.e., $\Delta f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for ≠f=15 kHz, two 0.5-ms slots per subframe for Δf=30 kHz, etc. In addition, the maximum carrier bandwidth is directly related to numerology according to $2^\mu*50$ MHz.

Table 1 below summarizes the supported NR numerologies and associated parameters.

Different DL and UL numerologies can be configured by the network.

TABLE 1

| $\mu$ | $\Delta f = 2^\mu \cdot 15$ (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 µs | 66.67 µs | 71.35 µs | 1 ms | 50 MHz |
| 1 | 30 | Normal | 2.34 µs | 33.33 µs | 35.68 µs | 0.5 ms | 100 MHz |
| 2 | 60 | Normal, Extended | 1.17 µs | 16.67 µs | 17.84 µs | 0.25 ms | 200 MHz |
| 3 | 120 | Normal | 0.59 µs | 8.33 µs | 8.92 µs | 125 µs | 400 MHz |
| 4 | 240 | Normal | 0.29 µs | 4.17 µs | 4.46 µs | 62.5 µs | 800 MHz |

Figure 6:
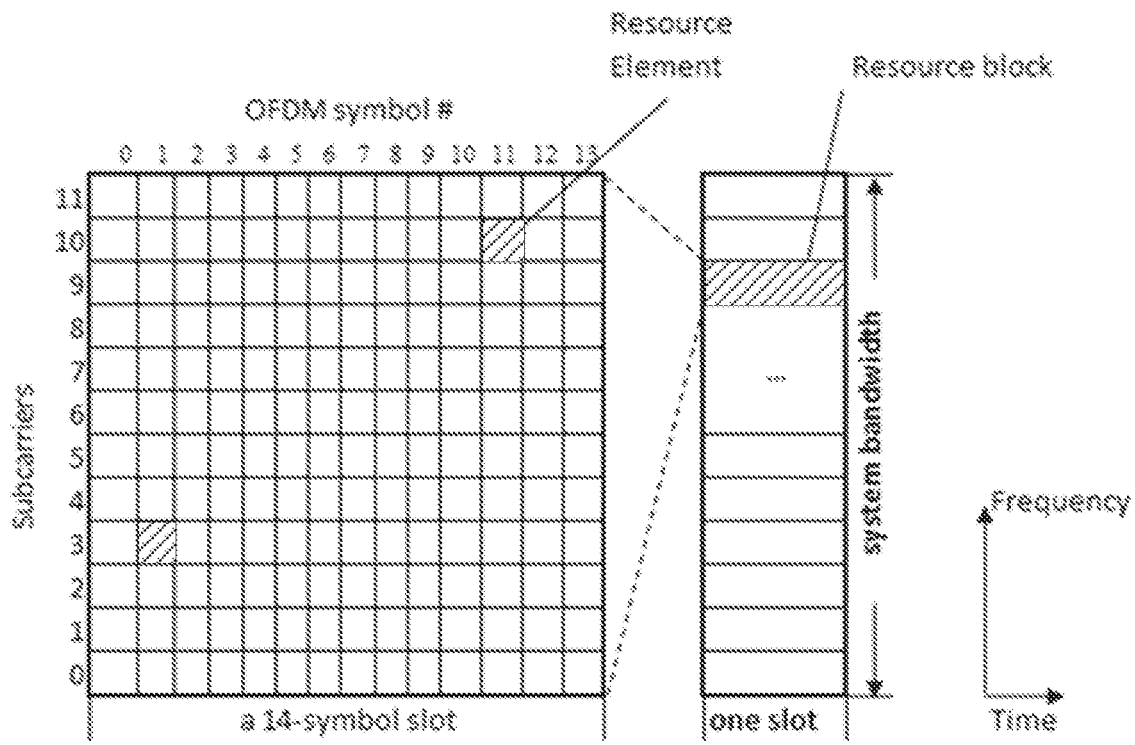
FIG. 6 shows an exemplary time-frequency resource grid for an NR (e.g., 5G) slot.

FIG. 6 shows an exemplary time-frequency resource grid for an NR slot. As illustrated in FIG. 6, a resource block (RB) consists of a group of 12 contiguous OFDM subcarriers for a duration of a 14-symbol slot. Like in LTE, a resource element (RE) consists of one subcarrier in one slot. An NR slot can include 14 OFDM symbols for normal cyclic prefix and 12 symbols for extended cyclic prefix.

Figure 7A:
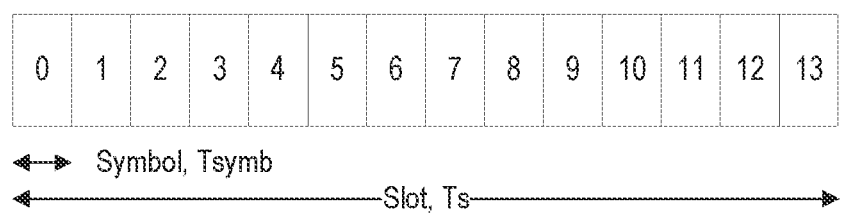
FIGS. 7A-7B, shows exemplary NR slot and mini-slot configurations.
Figure 7B:
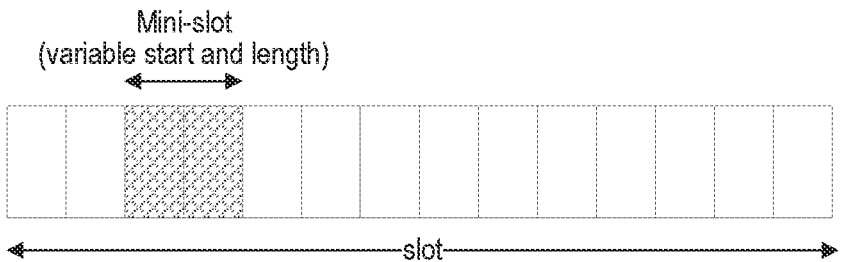

FIG. 7A shows an exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. FIG. 7B shows an exemplary mini-slot arrangement in which the mini-slot begins in the third symbol of the slot and is two symbols in duration. Applications of mini-slots include unlicensed spectrum and latency-critical transmission (e.g., URLLC). However, mini-slots are not service-specific and can also be used for eMBB or other services.

Figure 8A:
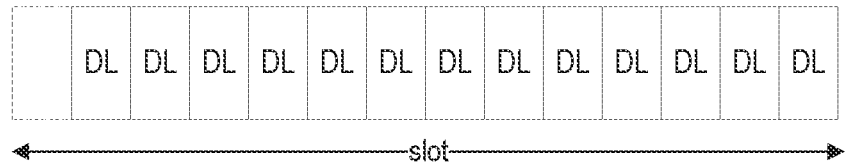
FIGS. 8A-8D, shows various exemplary uplink-downlink (UL-DL) arrangements within an NR slot.
Figure 8B:
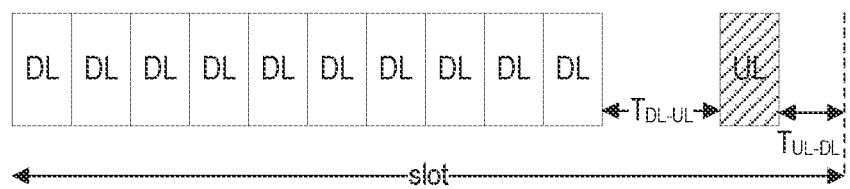
Figure 8C:
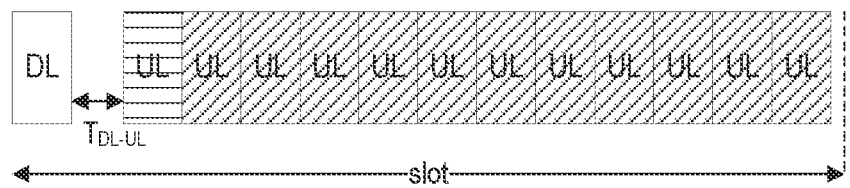
Figure 8D:
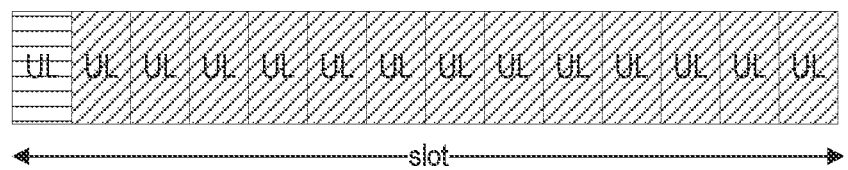

An NR slot can also be arranged with various combinations of UL and DL symbols. FIG. 8, which includes FIGS. 8A-8D, shows various exemplary UL-DL arrangements within an NR slot. For example, FIG. 8A shows an exemplary DL-only (i.e., no UL transmission) slot with transmission starting in symbol 1, i.e., a "late start." FIG. 8B shows an exemplary "DL-heavy" slot with one UL symbol. Moreover, this exemplary slot includes guard periods before and after ($T_{UL-DL}$) the UL symbol to facilitate change of transmission direction. FIG. 8C shows an exemplary "UL-heavy" slot with a single UL symbol that can carry DL control information (i.e., the initial UL symbol, as indicated by a different shading style) and a guard period ($T_{DL-UL}$) after the DL slot. FIG. 8D shows an exemplary UL-only slot with on-time start in symbol 0, with the initial UL symbol also usable to carry DL control information. In NR, PDCCH is confined to a region referred to as control resource set (CORESET).

A CORESET includes multiple RBs (i.e., multiples of 12 REs) in the frequency domain and 1-3 OFDM symbols in the time domain, as further defined in 3GPP TS 38.211 § 7.3.2.2. A CORESET is functionally similar to the control region in an LTE subframe. In NR, however, each REG consists of all 12 REs of one OFDM symbol in a RB, whereas an LTE REG includes only four REs. The CORESET time domain size can be configured by an RRC parameter. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET (i.e., 2, 3, or 5 REGs) can be indicated to the UE. The UE can assume that any precoder used for the transmission of the PDCCH is the same for all the REGs in the REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling can be performed dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3)

are used for other purposes including transmission of slot format information, reserved resource, transmit power control information, etc.

In NR Rel-15, the DCI formats 0_0/1_0 are referred to as "fallback DCI formats," while the DCI formats 0_1/1_1 are referred to as "non-fallback DCI formats." The fallback DCI support resource allocation type 1 in which DCI size depends on the size of active BWP. As such DCI formats 0_1/1_1 are intended for scheduling a single transport block (TB) transmission with limited flexibility. On the other hand, the non-fallback DCI formats can provide flexible TB scheduling with multi-layer transmission.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET. A hashing function can be used to determine the CCEs corresponding to PDCCH candidates that a UE must monitor within a search space set. The hashing is done differently for different UEs. In this manner, the CCEs used by the UEs are randomized and the probability of collisions between multiple UEs having messages included in a CORESET is reduced. Once a UE decodes a DCI, it de-scrambles the CRC with RNTI(s) that is(are) assigned to it and/or associated with the particular PDCCH search space. In case of a match, the UE considers the detected DCI addressed to it and follows the instructions (e.g., scheduling information) contained in the DCI.

For example, to determine the modulation order, target code rate, and TB size(s) for a scheduled PDSCH transmission, the UE first reads the five-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 V15.0.0 clause 5.1.3.1. Subsequently, the UE reads the redundancy version field (rv) in the DCI to determine the redundancy version. Based on this information together with the number of layers (v) and the total number of allocated PRBs before rate matching ($n_{PRB}$), the UE determines the TB Size (TBS) for the PDSCH according to the procedure defined in 3GPP TS 38.214 V15.0.0 clause 5.1.3.2.

For slot-based transmissions, the base station (e.g., gNB) transmits downlink control information (DCI) over the PDCCH that indicates which UE is scheduled to receive data in that slot, which RBs will carry that data. The DCI can include UL grants that indicate which UE is scheduled to transmit data in that slot, which RBs will carry that data. A UE first detects and decodes an uplink grant from PDCCH and, if successful, then transmits the corresponding PUSCH on the resources indicated by the grant. DCI formats 0_0 and 0_1 are used to convey UL grants for transmission on the PUSCH, while DCI formats 1_0 and 1_1 are used to convey DL grants for transmission on the PDSCH. Other DCI formats (2_0, 2_1, 2_2 and 2_3) are used for other purposes including transmission of slot format information, reserved resource, transmit power control information, etc.

NR supports two types of pre-configured resources, both of which are similar to existing LTE semi-persistent scheduling (SPS) with some enhancements such as support for transport block (TB) repetitions. FIG. 9 shows an exemplary ASN.1 data structure for a ConfiguredGrantConfig information element (IE) used for RRC configuration of NR type-1 and type-2 UL configured grants. In type 1, UL data transmission with configured grant is based only on RRC configuration without any L1 signaling. Type 2 is similar to the LTE SPS feature, where some parameters are preconfigured via RRC and some physical layer parameters are configured via MAC scheduling. L1 signaling is used for activation/deactivation of a type-2 grant. For example, a NR gNB explicitly activates the configured resources on PDCCH and the UE confirms reception of the activation/deactivation grant using a MAC control element.

NR TB repetition, mentioned above, involves the same resource configuration being used for K repetitions for a TB (where K includes the initial transmission). Possible values of K are {1, 2, 4, 8}. Repetitions follow a redundancy version (RV) sequence configured by UE-specific RRC signaling to one of the following sequences: {0, 2, 3, 1}, {0, 3, 0, 3}, or {0, 0, 0, 0}.

For both Type 1 and Type 2 pre-configured resources, UL periodicity is configured via the ConfiguredGrantConfig RRC IE. For example, Table 2 below shows the periodicities (in symbols) are supported for various configured subcarrier spacing (SCS).

TABLE 2

| SCS | Periodicity (sym.) | Possible values of n |
| --- | --- | --- |
| 15 kHz | 2, 7, or n*14 | 1, 2, 4, 5, 8, 10, 16, 20, 32, 40, 64, 80, 128, 160, 320, 640 |
| 30 kHz | | 1, 2, 4, 5, 8, 10, 16, 20, 32, 40, 64, 80, 128, 160, 320, 640, 1280 |
| 60 kHz (normal CP) | | 1, 2, 4, 5, 8, 10, 16, 20, 32, 40, 64, |
| 60 kHz (ext. CP) | 2, 6, or n*12 | 80, 128, 160, 320, 640, 1280, 2560 |

For Type 1 configured grants, the time resources are configured via RRC signaling:

timeDomainAllocation: Allocation of configured UL grant in time domain which contains startSymbolAndLength, including S as the starting symbol in a slot (S=0, 2, 4, or 8) and L as the length of the PUSCH (L=4, 6, 8, 10, 12, or 14 symbols). timeDomainOffset: Offset of a resource with respect to SFN=0 in time domain For Type2 configured grants, the periodicity is configured by RRC in the same way as for Type1, but the slot offset is dynamically indicated by the slot in which the UE receives the DCI that activates the Type2 configured grant. In contrast to Type1, the time domain allocation of PUSCH is indicated dynamically by DCI via the time domain resource assignment field (i.e., SLIV) in the same way as for scheduled (non-CG) PUSCH.

After an uplink grant is configured for a configured grant type 1, the MAC entity shall consider that the $N^{th}$ sequential uplink grant occurs in the symbol that satisfies the following equation (1):

$$[(SFN \times numberOfSlotsPerFrame \times numberOfSymbolsPerSlot) + (\text{slot number in the frame} \times numberOfSymbolsPerSlot) + \text{symbol number in the slot}] = (timeDomainOffset \times numberOfSymbolsPerSlot + S + N \times periodicity) \bmod (1024 \times numberOfSlotsPerFrame \times numberOfSymbolsPerSlot),$$

where S is the starting symbol specified by timeDomainAllocation.

Similarly, after an uplink grant is configured for a configured grant type 2, the MAC entity shall consider that the $N^{th}$ sequential uplink grant occurs in the symbol that satisfies the following equation (2):

$$[(SFN \times numberOfSlotsPerFrame \times numberOfSymbolsPerSlot) + (\text{slot number in the frame} \times numberOfSymbolsPerSlot) + \text{symbol number in the slot}] = [SFN_{start\ time} \times numberOfSlotsPerFrame \times numberOfSymbolsPerSlot + slot_{start\ time} \times numberOfSymbolsPerSlot + symbol_{start\ time} N \times periodicity] \bmod (1024 \times numberOfSlotsPerFrame \times numberOfSymbolsPerSlot),$$

where $SFN_{start\ time}$, $Slot_{start\ time}$, and $symbol_{start\ time}$ are the SFN, slot, and symbol, respectively, of the first transmission of PUSCH where the configured uplink grant was (re-)initialised.

For example, assuming 30-kHz subcarrier spacing, to configure UL resources on consecutive slots, a UE must be configured with one of the following:

Periodicity=2 symbols, S=0, L=2;
Periodicity=7 symbols, S=0, L=7; and
Periodicity=14 symbols (i.e., 1 slot, n=1), S=0, L=14, where S is the starting symbol and L is the length (in symbols) of PUSCH as configured in timeDomainAllocation.

Configured uplink scheduling can also be used in NR-U operation and can provide various exemplary benefits. For example, configured scheduling can improve the channel access probability for PUSCH transmission since the UE can acquire a channel for configured grant PUSCH after an LBT success, thereby avoiding additional LBTs for PDCCH transmission requesting additional UL grants. More specifically, only a single LBT procedure is needed for configured UL grants, as compared to three LBT procedures for dynamic UL grants relying on SR/BSR procedure: one for scheduling request (SR) transmission, one for PDCCH for UL grant, and one for PUSCH transmission. This can significantly improve the channel access probability for PUSCH transmission.

As described in 3GPP TR 38.889 (v16.0.0), for both Type 1 and Type 2, only an initial transmission of a TB is allowed to use a configured grant. In other words, any HARQ retransmissions of a TB must rely on dynamic UL grant, which is indicated via PDCCH addressed to CS-RNTI.

As briefly mentioned above, autonomous uplink (AUL) is also being developed for NR Rel-16, based on the configured UL scheduling scheme in Rel-15. AUL is intended to support autonomous HARQ retransmission using a configured grant. In this arrangement, a new UE timer (referred to as "CG retransmission timer") is needed to protect the HARQ procedure so that the retransmission can use the same HARQ process for both transmission and retransmission of a transport block (TB) of UL data.

Even so, the baseline for AUL is type-1 and type-2 configure grants (CG). As such, enhancements relative to these existing CGs are considered for AUL features. For example, the following agreements concerning AUL have been reached within 3GPP RAN WG2:

R2 assumes that the configured grant timer is not started/restarted when configured grant is not transmitted due to LBT failure. PDU overwrite need to be avoided somehow.

The configured grant timer is not started/restarted when UL LBT fails on PUSCH transmission for grant received by PDCCH addressed to CS-RNTI scheduling retransmission for configured grant.

The configured grant timer is not started/restarted when the UL LBT fails on PUSCH transmission for UL grant received by PDCCH addressed to C-RNTI, which indicates the same HARQ process configured for configured uplink grant.

Retransmissions of a TB using configured grant resources, when initial transmission or a retransmission of the TB was previously done using dynamically scheduled resources, is not allowed.

A new timer is introduced for auto retransmission (i.e. timer expiry=HARQ NACK) on configured grant for the case of the TB previous being transmitted on a configured grant "CG retransmission timer".

CG retransmission timer is started when the TB is actually transmitted on the configured grant and stopped upon reception of HARQ feedback (DFI) or dynamic grant for the HARQ process.

The legacy configured grant timer ("CG timer") and its behaviour is kept for preventing the configured grant from overriding the TB scheduled by dynamic grant, i.e., it is (re)started upon reception of the PDCCH as well as transmission on the PUSCH of dynamic grant.

For AUL, the serving gNB can also schedule retransmission for a UE when previous transmission using a configured grant fails. As specified in 3GPP TR 38.889 (V16.0.0), in relation to the resource allocation, NR-U shall support configured grants of resources that are consecutive in the time domain without any gaps in between. On the other hand, configured grants of non-consecutive (not necessarily periodic) resources with gaps in between can be beneficial in some scenarios and should be considered for NR in unlicensed spectrum.

As for potential solutions for time-domain resource allocation flexibility, both a new bitmap approach and the NR Rel-15 time-domain resource allocation approach (i.e., periodicity, offset in the frame, start symbol and length of PUSCH, and K-repetition) are identified as potential candidates. Additional features such as finer granularity of resource allocation and multiple resources within a period may also be considered for enhancing time domain resource allocation flexibility. For example, in RAN WG1 #97, it was agreed that "for configured grant time domain resource allocation, the mechanisms in Rel-15 (both Type 1 and Type 2) are extended so that the number of allocated slots following the time instance corresponding to the indicated offset can be configured. FFS (for further study) how to indicate multiple PUSCHs within a slot."

Even so, these approaches can result in various issues, drawbacks, and/or problems for operation in unlicensed/shared spectrum. According to the agreements in 3GPP RAN WG2 #105bis, the CG timer and the CG retransmission timer can be started only when the TB is actually transmitted using a configured grant. If the TB is not transmitted, such as due to an LBT failure (e.g., busy channel), the timers will not be started and the TB becomes pending in the HARQ buffer. At the same time, since the TB is not transmitted, the gNB is not aware that there was a transmission attempt at the UE, therefore the gNB is not able to assign a retransmission grant to UE.

The UE may transmit the pending TB using the same HARQ process on the next configured grant resource. Even so, the UE may have new data arrived prior to the next configured grant resource. Upon the next CG transmission opportunity, if the UE sends the pending TB in HARQ buffer (e.g., based on a scheduling rule), the new data will be delayed. On the other hand, the pending data may experience additional delay if the UE sends the new data instead.

Figure 10:
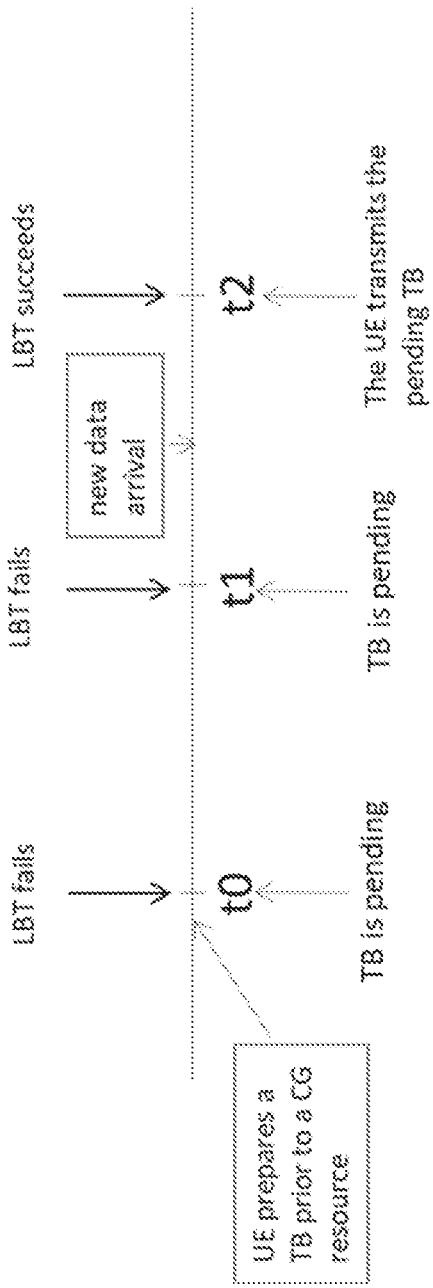
FIG. 10 shows an exemplary scenario in which newly arrived data is delayed in favor of pending data after a UE's listen-before-talk (LBT) failure.

FIG. 10 shows an exemplary scenario that illustrates delaying newly arrived data in favor of pending data after an LBT failure. In FIG. 10, the UE prepares a TB of data prior to availability of a transmission opportunity at t0. The transmission opportunity can be part of a configured grant, and as such can also be referred to as a "CG transmission resource" or "CG resource." In general, "preparing" at TB block of data can include mapping data bits (e.g., from a higher protocol layer) into a TB according to the MCS and the TBS being used by the PHY, and storing the TB in a HARQ buffer.

In this case, however, the UE's LBT procedure at t0 fails and the UE's LBT procedure at the next transmission opportunity (t1) also fails. As such, the prepared TB is still pending when new data for UL transmission arrives after t1 but before the UE's next transmission opportunity at t2. The UE's LBT procedure at t2 succeeds, and the UE is faced with the decision of whether to send the pending or new data, with the consequences discussed above. In general, the transmission opportunities t0-t2 can be in respective timeslots, e.g., as allocated by a CG.

Accordingly, exemplary embodiments of the present disclosure provide techniques, applicable when a TB is pending (e.g., due to LBT failure) and new data arrives, that facilitate selecting between transmitting the pending data or the new data at the next transmission opportunity. According to various embodiments, this selection can be based on various preconfigured rules, criteria, and/or considerations, including QoS characteristics of the respective data to be transmitted. In this manner, embodiments can improve flexibility for handling configured UL resources, and can better satisfy QoS requirements of various services that share the same configured UL resource.

The following description of exemplary embodiments is given in the context of NR-U. Even so, NR-U is only exemplary, and embodiments are equally applicable to other unlicensed scenarios (e.g., LTE LAA/eLAA/feLAA/Multe-Fire) as well as for operation in licensed spectrum. In addition, the term "autonomous UL transmission" (or AUL) is used to represent a function in which a UE performs and/or initiates UL transmissions autonomously without using a dynamic grant. Other terms that refer to the same or a substantially similar function can also apply. More generally, embodiments are applicable to any UE-triggered transmission that is made without receiving dynamically assigned resources from a serving network node (e.g., gNB).

The following description of exemplary embodiments is based on the following scenario.

A UE with a configured UL grant (CG) is unable to transmit a first transport block (TB) of UL data in the CG UL resource due to LBT failure (e.g., channel busy). As such, the first TB is still pending (referred to as "pending data") until the next occurrence of the CG UL resource. Prior to the next CG UL resource occurrence, new data (e.g., a second TB) arrives at the UE. As such, both the pending data (e.g., first TB) and the newly arrived data (e.g., second TB) are pending at the time of the next CG UL resource.

In some embodiments, the UE is configured to prioritize the new data or the pending data at the next CG UL resource based on at least one of the following conditions and/or criteria:
the logical channel priority or service type associated with the respective data;
the QoS requirements associated with the respective data, such as latency, transmission reliability, jitter, packet loss, etc.;
the queuing time of the pending data.

For example, the UE can prioritize the new data (e.g., second TB) at the next CG UL resource if any of the following are true:
the new data has higher priority than the pending data;
the new data has more critical QoS requirements (e.g., lower latency) than the pending data;
the queuing time of the pending data is less than or equal to a first predetermined (e.g., preconfigured) threshold, such that the pending data will meet its QoS requirements even if new data is transmitted first; or
the queuing time of the pending data is higher than a second predetermined (e.g., preconfigured) threshold, such that the pending data will not meet its QoS requirements even if it is sent first.

On the other hand, the UE can prioritize the pending data (e.g., first TB) at the next CG UL resource if any of the following are true:
the pending data has higher priority than the new data
the pending data has more critical QoS requirements (e.g., lower latency) than the pending data;
the queuing time of the pending data is higher than a third predetermined (e.g., preconfigured) threshold, such that the pending data must be transmitted first to meet its QoS requirements.

Figure 11:
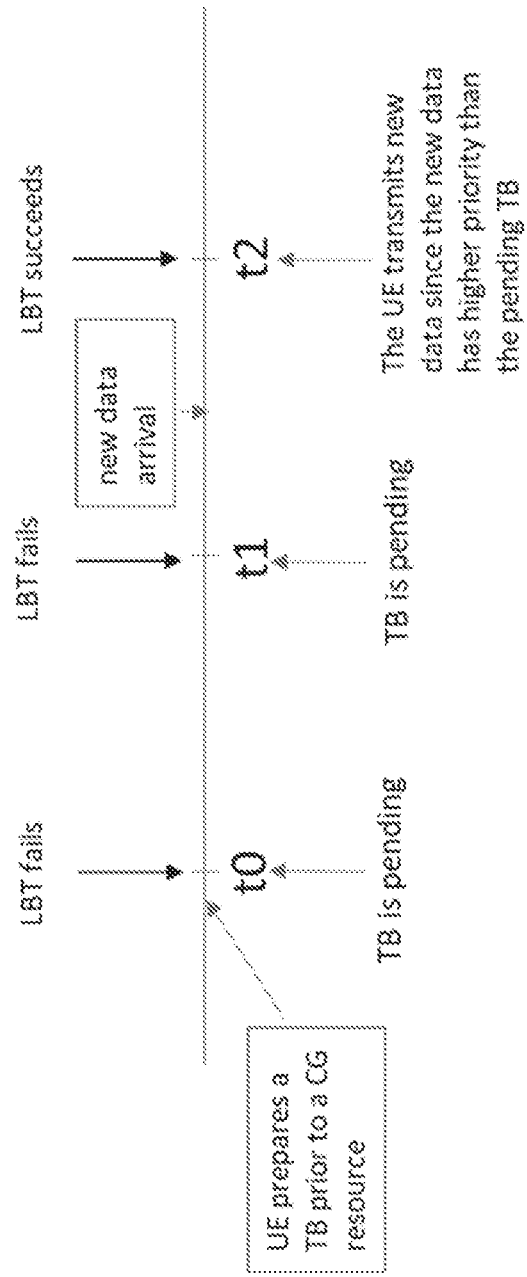
FIG. 11 shows an exemplary scenario in which newly arrived data is prioritized over pending data after a UE's listen-before-talk (LBT) failure, according to various exemplary embodiments of the present disclosure.

FIG. 11 shows an exemplary scenario that illustrates these embodiments. Similar to FIG. 10, the UE prepares a TB of data prior to a transmission opportunity at t0. However, the UE's LBT procedures fail at both t0 and the next transmission opportunity t1, after which new data arrives before the next transmission opportunity at t2. At t2, the UE's LBT succeeds and the UE transmits the new data because it has a higher priority than the pending data.

In other embodiments, the UE is configured to prioritize the new data or the pending data at the next transmission opportunity (or CG UL resource) based on a configured rule. The configured rule can be one of the following:
prioritize any pending data over any new data; or
prioritize any new data over any pending data.

The rule may be configured by the serving network node via dedicated RRC messages, broadcast system information, a MAC CE, or a DCI. The rule may also be fixed in the standard or have a default if nothing else is signaled. The rule may be reconfigured by the gNB from time to time if it is necessary.

Although discussed above in terms of new data and pending data, the various embodiments described above are also applicable to prioritizing between any of the following:
multiple pending TBs, i.e., pending data that has been prepared for transmission;
new data and existing data not yet prepared for transmission as TB(s); or
pending TBs and existing data not yet prepared for transmission as TB(s).

In other embodiments, the UE may only consider sending the new data instead of sending the pending TB if the new data arrived a particular duration, T, before the CG UL resource (i.e., the next transmission opportunity). The duration T may be determined by the UE based on the processing delay for preparing a TB for transmission. For example, if the UE needs X milliseconds (or slots) to prepare a TB and the new data arrived less than X milliseconds (or slots) before the transmission opportunity, the UE may send the pending TB even if the new data had higher priority. The time T may be situation-dependent, e.g., based on other processing tasks the UE must perform during the X milliseconds (or slots).

In other embodiments, the UE may only consider sending the new data instead of the pending data if there is a free HARQ buffer from which the new data could be transmitted (e.g., a HARQ buffer without data awaiting retransmission(s)). For example, if there are TBs in all HARQ buffers and these TBs are still subject to (re)transmissions, the UE may send the pending TB rather than the new data, even if the new data should be transmitted according to a priority or a rule (such as in the embodiments described above).

One way of implementing the embodiments described herein is that the UE builds a second TB for the new data and places that in a second HARQ buffer, whereas the pending first TB is in a different first HARQ buffer. The UE will then transmit from the first or second HARQ buffer based on the outcome of the selection according to any of the embodiments described above. This approach may be relatively less processing-intensive but it requires at least one free HARQ process.

Another way of implementing the embodiments described herein is that the UE builds a new TB for the new data and places that in the same HARQ buffer (e.g., a first HARQ buffer associated with the same HARQ process) as the pending first TB. The data in the pending TB then needs to be included in another TB and may therefore need to be placed back in to buffers on higher layers such as in RLC-buffers. In case the new TB is transmitted first, the UE can store the pending TB in the HARQ buffer, and reorder the new TB, and send it first. As another alternative, in case the new TB is transmitted first, the pending TB can be directly dropped, and trigger upper layer retransmission (e.g., at RLC or PDCP).

In any of the embodiments described herein, in case the new data (e.g., second TB) is transmitted first, the pending first TB can be directly dropped, and trigger upper layer retransmission (e.g., at RLC or PDCP). In any of the embodiments described herein, the pending TB may need to update the UCI information prior to transmission.

The various embodiments described above are based on the scenario that a UE has configured UL grants for transmitting the pending or new data. However, the methods described in the embodiments can also be applied in case of dynamic grants. For example, a UE uses a configured grant valid in slot T to attempt a first transmission of a TB. However, if LBT fails in slot T, the UE will perform a retransmission from the HARQ process carrying this TB at a later slot (and this TB would then be a "pending TB"). At this later transmission opportunity for this HARQ process (e.g., based on a dynamic grant), the UE may apply any of the embodiments described herein to determine if the pending TB should be transmitted or if some potential new data should be transmitted.

As mentioned above, there may be several pending TBs and the UE may apply the embodiments described herein for determining whether to send new data or any of the pending TBs. Similarly, there may be several pieces of "new data" and the new data may be larger than is possible to fit in one TB and hence there may be several TBs with "new data." As such, the UE may apply the embodiments described herein to determine for each TB with "new data" whether to transmit that TB or a so-called "pending TB".

Figure 12:
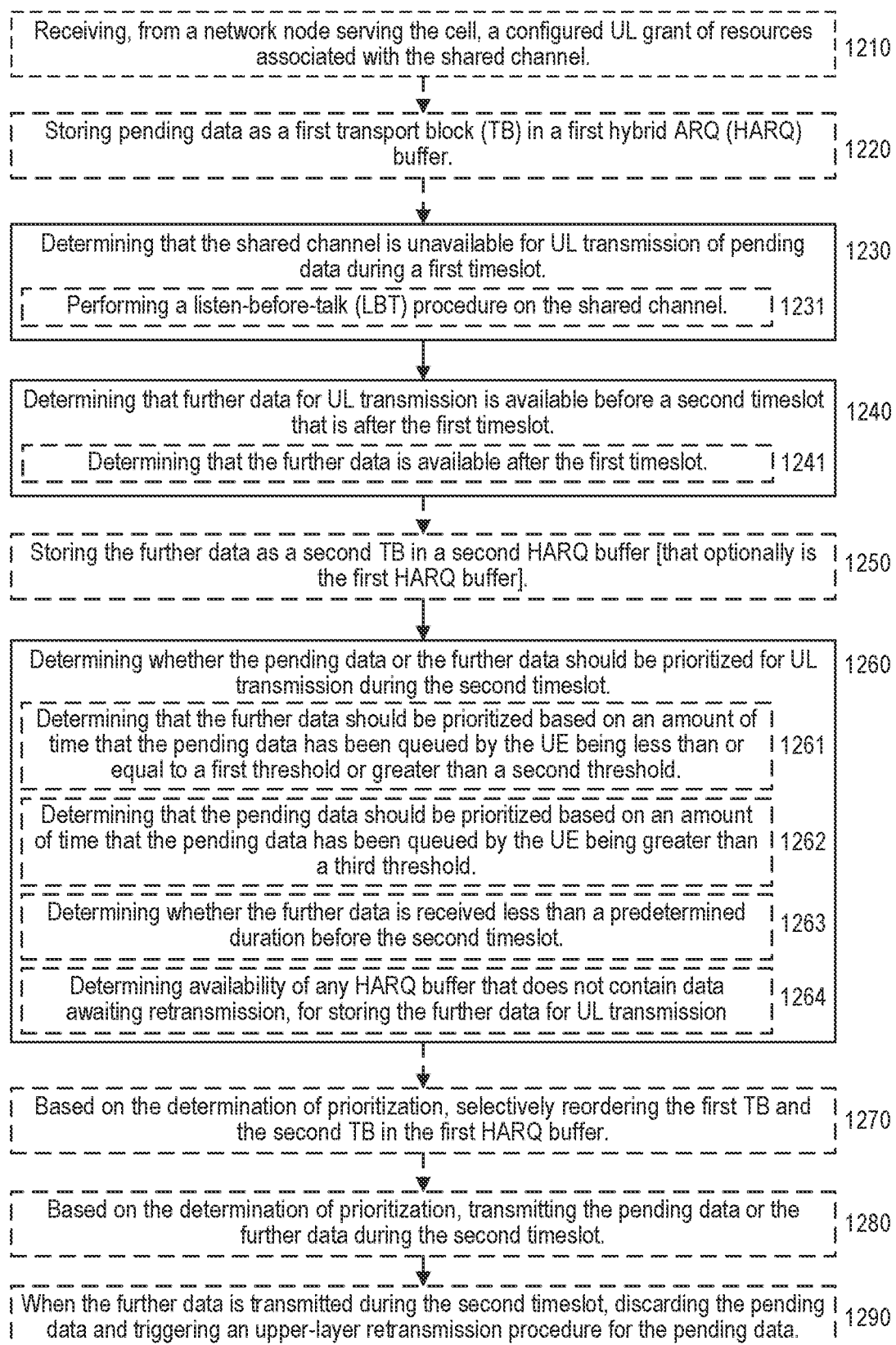
FIG. 12 is a flow diagram of an exemplary method (e.g., procedure) performed by a UE, according to various exemplary embodiments of the present disclosure.

Embodiments described above (e.g., in relation to FIG. 11) are further illustrated by FIG. 12, which shows a flow diagram of an exemplary method (e.g., procedure) for uplink (UL) transmission on a shared channel within a cell of a radio access network (RAN). The exemplary method can be performed by a user equipment (UE, e.g., wireless device, IoT device, modem, etc. or component thereof) in communication with a network node (e.g., base station, eNB, gNB, etc., or components thereof) configured to serve the cell in the RAN (e.g., E-UTRAN, NG-RAN). Although FIG. 12 shows specific blocks in a particular order, the operations of the exemplary method can be performed in a different order than shown and can be combined and/or divided into blocks having different functionality than shown. Optional blocks or operations are indicated by dashed lines.

The exemplary method can include operations of block 1230, where the UE can determine that the shared channel is unavailable for UL transmission of pending data during a first transmission opportunity. In some embodiments, the operations of block 1230 can include the operations of sub-block 1231, where the UE can perform a listen-before-talk (LBT) procedure on the shared channel In such embodiments, the pending data can be pending due a previous determination, by a previous LBT procedure, that the shared channel was unavailable for UL transmission during a previous transmission opportunity before the first transmission opportunity. The LBT procedure in sub-block 1231 can be performed in any manner described herein, including energy detection, virtual carrier sensing, etc. This operation can correspond to either of the LBT operations at t0 and t1 in FIG. 11.

The exemplary method can also include operations of block 1240, where the UE can determine that further data for UL transmission is available before a second transmission opportunity that is after the first transmission opportunity. In some embodiments, the operations of block 1240 can include the operations of sub-block 1241, where the UE can determine that the further data is available after the first transmission opportunity (e.g., the further data arrives after the first transmission opportunity). The operations of block 1240 (including sub-block 1241) can correspond to the new data arrival, in FIG. 11, after t0 and t1 but before t2.

In some embodiments, the exemplary method can also include the operations of block 1210, where the UE can receive, from a network node serving the cell, a configured UL grant of resources associated with the shared channel. The configured UL grant can be applicable for a plurality of transmission opportunities during which UL transmission by the UE is permitted on the shared channel The plurality of transmission opportunities can include the first and second transmission opportunities. In some embodiments, the shared channel can be a PUSCH. For example, the UE can receive the configured UL grant via DCI over PDCCH or RRC signaling over PDSCH.

The exemplary method can also include operations of block 1260, where the UE can determine whether the pending data or the further data should be prioritized for UL transmission during the second transmission opportunity. In some embodiments, this operation can be based on any of the following:
   logical channel priorities associated with the pending data and with the further data;

service types associated with the pending data and with the further data;

quality of service (QoS) requirements associated with the pending data and with the further data;

an amount of time that the pending data has been queued by the UE;

a predetermined rule prioritizing data pending before an LBT determination that the shared channel is unavailable; and a predetermined rule prioritizing data received after an LBT determination that the shared channel is unavailable.

In some embodiments, the operations of block 1260 can include the operations of sub-block 1261, where the UE can determine that the further data should be prioritized based on an amount of time that the pending data has been queued by the UE being one of the following:

less than or equal to a first threshold, such that the pending data will meet its associated QoS requirements even if the further data is prioritized; or greater than a second threshold, such that the pending data will not meet its associated QoS requirements even if it is prioritized.

In some embodiments, the operations of block 1260 can include the operations of sub-block 1262, where the UE can determine that the pending data should be prioritized based on an amount of time that the pending data has been queued by the UE being greater than a third threshold, such that the pending data must be prioritized to meet its QoS requirements.

In some embodiments, the operations of block 1260 can include the operations of sub-block 1263, where the UE can determine whether the further data was received less than a predetermined duration before the second transmission opportunity. This predetermined duration can be associated with an amount of time needed by the UE to prepare a transport block (TB) containing the further data (e.g., UE processing delay(s), such as described above). In some of these embodiments, when the further data is received less than the predetermined duration before the second transmission opportunity, the pending data can be prioritized regardless of other reasons for prioritizing the further data.

In some embodiments, the operations of block 1260 can include the operations of sub-block 1264, where the UE can determine availability of any hybrid ARQ (HARQ) buffer that does not contain data awaiting retransmission, for storing the further data for UL transmission. In some of these embodiments, when no HARQ buffers that do not contain data awaiting retransmission determined to be are available, the pending data can be prioritized regardless of other reasons for prioritizing the further data.

In some embodiments, the exemplary method can also include operations of blocks 1220 and 1250. In block 1220, the UE can store the pending data as a first transport block (TB) in a first hybrid ARQ (HARQ) buffer. In block 1250, the UE can store the further data as a second TB in a second HARQ buffer.

In some of these embodiments, the second HARQ buffer can be associated with a different HARQ process than the first HARQ buffer. In other of these embodiments, the second HARQ buffer is the first HARQ buffer and the exemplary method can also include the operations of block 1270, where the UE can, based on the determination of prioritization, selectively reorder the first TB and the second TB in the first HARQ buffer. For example, based on determining that the further data (e.g., stored as the second TB) should be prioritized, the UE can put the second TB ahead of the first TB in the first HARQ buffer so the second TB it can be transmitted before the first TB. As another example, the UE can place the second TB at the head of the first HARQ buffer so that it will be transmitted before any other TBs stored in the first HARQ buffer.

In some embodiments, the exemplary method can also include operations of block 1280, where the UE can, based on the determination of prioritization (e.g., in block 1260), transmit the pending data or the further data during the second transmission opportunity. In some of these embodiments, transmitting the pending data or the further data can also be based on determining that the shared channel is available for UL transmission during the second transmission opportunity. For example, this determination can be based on a further LBT procedure, such as indicated by "LBT succeeds" at t2 in FIG. 11.

In some embodiments, the exemplary method can also include the operations of block 1290, where the UE can, when the further data is transmitted during the second transmission opportunity, discard the pending data and trigger an upper-layer retransmission procedure for the pending data.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 13:
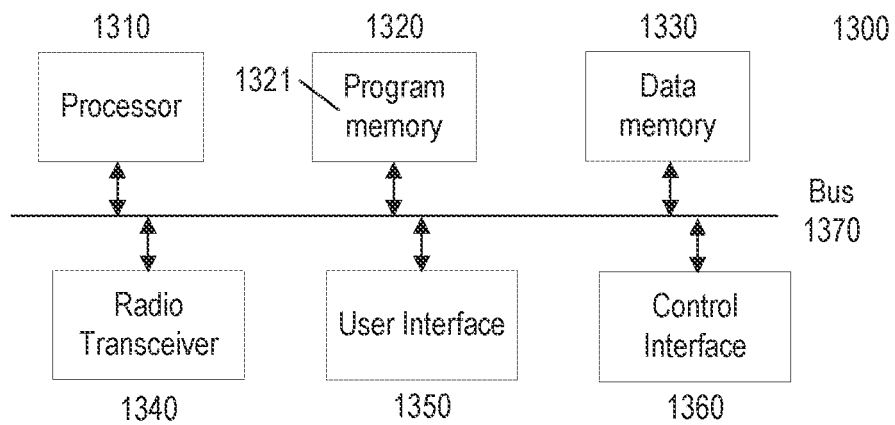
FIG. 13 illustrates a block diagram of an exemplary wireless device or UE, according to various exemplary embodiments of the present disclosure.

FIG. 13 shows a block diagram of an exemplary wireless device or user equipment (UE) configurable according to various exemplary embodiments of the present disclosure, including by execution of instructions on a computer-readable medium that correspond to, or comprise, any of the exemplary methods and/or procedures described above. For simplicity, the exemplary wireless device or UE will be referred to as "device 1300" in the following description.

Exemplary device 1300 can comprise a processor 1310 that can be operably connected to a program memory 1320 and/or a data memory 1330 via a bus 1370 that can comprise parallel address and data buses, serial ports, or other methods and/or structures known to those of ordinary skill in the art. Program memory 1320 can store software code, programs, and/or instructions (collectively shown as computer program product 1321 in FIG. 13) executed by processor 1310 that can configure and/or facilitate device 1300 to perform various operations, including operations described below. For example, execution of such instructions can configure and/or facilitate exemplary device 1300 to communicate using one or more wired or wireless communication protocols, including one or more wireless communication protocols standardized by 3GPP, 3GPP2, or IEEE, such as those commonly known as 5G/NR, NR-U, LTE, LTE-A, LTE LAA/eLAA/feLAA, UMTS, HSPA, GSM, GPRS, EDGE, 1xRTT, CDMA2000, 802.11 WiFi, HDMI, USB, Firewire, etc., or any other current or future protocols that can be utilized in conjunction with radio transceiver 1340, user interface 1350, and/or host interface 1360.

As another example, processor 1310 can execute program code stored in program memory 1320 that corresponds to MAC, RLC, PDCP, and RRC layer protocols standardized by 3GPP (e.g., for NR and/or LTE). As a further example, processor 1310 can execute program code stored in program memory 1320 that, together with radio transceiver 1340, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

Program memory 1320 can also comprises software code executed by processor 1310 to control the functions of device 1300, including configuring and controlling various components such as radio transceiver 1340, user interface 1350, and/or host interface 1360. Program memory 1320 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1320 can comprise an external storage arrangement (not shown) remote from device 1300, from which the instructions can be downloaded into program memory 1320 located within or removably coupled to device 1300, so as to enable execution of such instructions.

Data memory 1330 can comprise memory area for processor 1310 to store variables used in protocols, configuration, control, and other functions of device 1300, including operations corresponding to, or comprising, any of the exemplary methods and/or procedures described herein. Moreover, program memory 1320 and/or data memory 1330 can comprise non-volatile memory (e.g., flash memory), volatile memory (e.g., static or dynamic RAM), or a combination thereof. Furthermore, data memory 1330 can comprise a memory slot by which removable memory cards in one or more formats (e.g., SD Card, Memory Stick, Compact Flash, etc.) can be inserted and removed. Persons of ordinary skill in the art will recognize that processor 1310 can comprise multiple individual processors (including, e.g., multi-core processors), each of which implements a portion of the functionality described above. In such cases, multiple individual processors can be commonly connected to program memory 1320 and data memory 1330 or individually connected to multiple individual program memories and or data memories. More generally, persons of ordinary skill in the art will recognize that various protocols and other functions of device 1300 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A radio transceiver 1340 can comprise radio-frequency transmitter and/or receiver circuitry that facilitates the device 1300 to communicate with other equipment supporting like wireless communication standards and/or protocols. In some exemplary embodiments, the radio transceiver 1340 includes a transmitter and a receiver that enable device 1300 to communicate with various 5G/NR networks according to various protocols and/or methods proposed for standardization by 3GPP and/or other standards bodies. For example, such functionality can operate cooperatively with processor 1310 to implement a PHY layer based on OFDM, OFDMA, and/or SC-FDMA technologies, such as described herein with respect to other figures.

In some exemplary embodiments, radio transceiver 1340 includes an LTE transmitter and receiver that can facilitate device 1300 to communicate with various LTE, LTE-Advanced (LTE-A), and/or NR networks according to standards promulgated by 3GPP. In some exemplary embodiments, radio transceiver 1340 includes circuitry, firmware, etc. necessary for the device 1300 to communicate with various 5G/NR, LTE, LTE-A, UMTS, and/or GSM/EDGE networks, also according to 3GPP standards. In some exemplary embodiments of the present disclosure, radio transceiver 1340 includes circuitry, firmware, etc. necessary for the device 1300 to communicate with various CDMA2000 networks, according to 3GPP2 standards. In some exemplary embodiments of the present disclosure, the radio transceiver 1340 is capable of communicating using radio technologies that operate in unlicensed frequency bands, such as IEEE 802.11 WiFi that operates using frequencies in the regions of 2.4, 5.6, and/or 60 GHz. In some exemplary embodiments, radio transceiver 1340 can include circuitry, firmware, etc. necessary for the device 1300 to communicate using cellular protocols in unlicensed or shared spectrum, e.g., via NR-U, LTE LAA/eLAA/feLAA, MulteFire, etc.

In some exemplary embodiments of the present disclosure, radio transceiver 1340 can comprise a transceiver that is capable of wired communication, such as by using IEEE 802.3 Ethernet technology.

The functionality of radio transceiver 1340 specific to each of these embodiments can be coupled with and/or controlled by other circuitry in the device 1300, such as the processor 1310 executing program code stored in program memory 1320 in conjunction with, or supported by, data memory 1330.

User interface 1350 can take various forms depending on the particular embodiment of device 1300, or can be absent from device 1300 entirely. In some exemplary embodiments, user interface 1350 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the device 1300 can comprise a tablet computing device including a larger touchscreen display. In such embodiments, one or more of the mechanical features of the user interface 1350 can be replaced by comparable or functionally equivalent virtual user interface features (e.g., virtual keypad, virtual buttons, etc.) implemented using the touchscreen display, as familiar to persons of ordinary skill in the art. In other embodiments, the device 1300 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 1300 having a touch screen display are capable of receiving user inputs, such as inputs related to exemplary methods and/or procedures described herein or otherwise known to persons of ordinary skill in the art.

In some exemplary embodiments of the present disclosure, device 1300 can comprise an orientation sensor, which can be used in various ways by features and functions of device 1300. For example, the device 1300 can use outputs of the orientation sensor to determine when a user has changed the physical orientation of the device 1300's touch screen display. An indication signal from the orientation sensor can be available to any application program executing on the device 1300, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1360 of the device 1300 can take various forms depending on the particular exemplary embodiment of device 1300 and of the particular interface requirements of other devices that the device 1300 is intended to communicate with and/or control. For example, the control interface 1360 can comprise an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1360 can comprise an IEEE 802.3 Ethernet interface such as described above. In some exemplary embodiments of the present disclosure, the control interface 1360 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 1300 can comprise more functionality than is shown in FIG. 13 including, for example, a video and/or still-image camera, microphone, media player and/or recorder, etc. Moreover, radio transceiver 1340 can include circuitry necessary to communicate using additional radio-frequency communication standards including Bluetooth, GPS, and/or others. Moreover, the processor 1310 can execute software code stored in the program memory 1320 to control such additional functionality. For example, directional velocity and/or position estimates output from a GPS receiver can be available to any application program executing on the device 1300, including various exemplary methods and/or computer-readable media according to various exemplary embodiments of the present disclosure.

Figure 14:
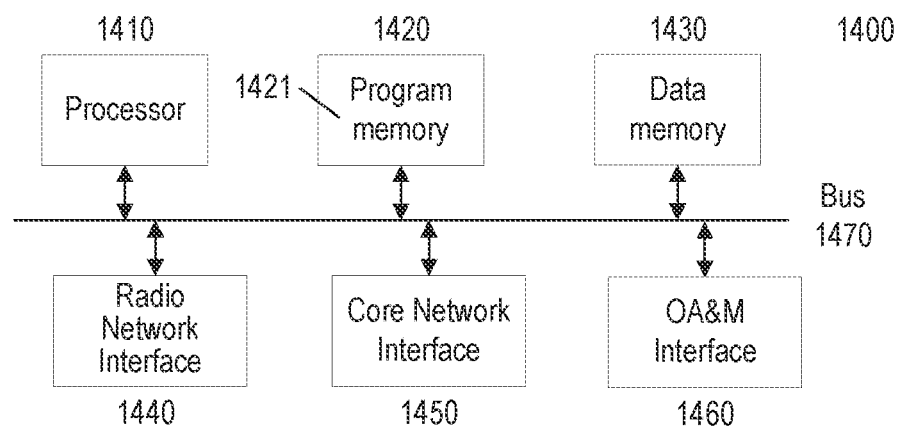
FIG. 14 illustrates a block diagram of an exemplary network node in a radio access network (e.g., an gNB in an NG-RAN).

FIG. 14 shows a block diagram of an exemplary network node 1400 configurable according to various embodiments of the present disclosure, including those described above with reference to other figures. In some exemplary embodiments, network node 1400 can comprise a base station, eNB, gNB, or component thereof. Network node 1400 includes processor 1410 that is operably connected to program memory 1420 and data memory 1430 via bus 1470, which can comprise parallel address and data buses, serial ports, or other methods and/or structures known to those of ordinary skill in the art.

Program memory 1420 can store software code, programs, and/or instructions (collectively shown as computer program product 1421 in FIG. 14) executed by processor 1410 that can configure and/or facilitate network node 1400 to perform various operations, including operations described below. For example, execution of such stored instructions can configure network node 1400 to communicate with one or more other devices using protocols according to various embodiments of the present disclosure, including one or more exemplary methods and/or procedures discussed above. Furthermore, execution of such stored instructions can also configure and/or facilitate network node 1400 to communicate with one or more other devices using other protocols or protocol layers, such as one or more of the PHY, MAC, RLC, PDCP, and RRC layer protocols standardized by 3GPP for NR, NR-U, LTE, LTE-A, LTE LAA/eLAA/feLAA, or any other higher-layer protocols utilized in conjunction with radio network interface 1440 and core network interface 1450. By way of example and without limitation, core network interface 1450 can comprise the S1 interface and radio network interface 1450 can comprise the Uu interface, as standardized by 3GPP. Program memory 1420 can also include software code executed by processor 1410 to control the functions of network node 1400, including configuring and controlling various components such as radio network interface 1440 and core network interface 1450.

Data memory 1430 can comprise memory area for processor 1410 to store variables used in protocols, configuration, control, and other functions of network node 1400. As such, program memory 1420 and data memory 1430 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1410 can comprise multiple individual processors (not shown), each of which implements a portion of the functionality described above. In such case, multiple individual processors may be commonly connected to program memory 1420 and data memory 1430 or individually connected to multiple individual program memories and/or data memories. More generally, persons of ordinary skill in the art will recognize that various protocols and other functions of network node 1400 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1440 can comprise transmitters, receivers, signal processors, ASICs, antennas, beamforming units, and other circuitry that enables network node 1400 to communicate with other equipment such as, in some embodiments, a plurality of compatible user equipment (UE). In some exemplary embodiments, radio network interface 1440 can comprise various protocols or protocol layers, such as the PHY, MAC, RLC, PDCP, and RRC layer protocols standardized by 3GPP for NR, NR-U, LTE, LTE-A, and/or LTE LAA/eLAA/feLAA; improvements thereto such as described herein above; or any other higher-layer protocols utilized in conjunction with radio network interface 1440. According to further exemplary embodiments, the radio network interface 1440 can comprise a PHY layer based on OFDM, OFDMA, and/or SC-FDMA technologies. In some embodiments, the functionality of such a PHY layer can be provided cooperatively by radio network interface 1440 and processor 1410, possibly in conjunction with program code or computer program product 1421 in memory 1420.

Core network interface 1450 can comprise transmitters, receivers, and other circuitry that enables network node 1400 to communicate with other equipment in a core network such as, in some embodiments, circuit-switched (CS) and/or packet-switched Core (PS) networks. In some embodiments, core network interface 1450 can comprise the S1 interface standardized by 3GPP. In some exemplary embodiments, core network interface 1450 can comprise one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of core network interface 1450 can comprise one or more of asynchronous transfer mode (ATM), Internet Protocol (IP)-over-Ethernet, SDH over optical fiber, T1/E1/PDH over a copper wire, microwave radio, integrated access backhaul (IAB), or other wired or wireless transmission technologies known to those of ordinary skill in the art.

OA&M interface 1460 can comprise transmitters, receivers, and other circuitry that enables network node 1400 to communicate with external networks, computers, databases, and the like for purposes of operations, administration, and maintenance of network node 1400 or other network equipment operably connected thereto. Lower layers of OA&M interface 1460 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1440, core network interface 1450, and OA&M interface 1460 may be multiplexed together on a single physical interface, such as the examples listed above.

Figure 15:
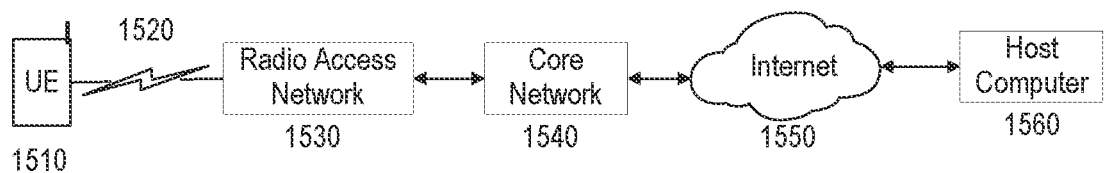
FIG. 15 illustrates a block diagram of an exemplary network configuration usable to provide over-the-top (OTT) data services between a host computer and a UE, according to various exemplary embodiments of the present disclosure.

FIG. 15 is a block diagram of an exemplary communication network configured to provide over-the-top (OTT) data services between a host computer and a user equipment (UE), according to one or more exemplary embodiments of the present disclosure. UE 1510 can communicate with radio access network (RAN) 1530 over radio interface 1520, which can be based on protocols described above including, e.g., LTE, LTE-A, and 5G/NR. For example, UE 1510 can be configured and/or arranged as shown in other figures discussed above. RAN 1530 can include one or more network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1530 can cooperatively operate using licensed and unlicensed spectrum.

RAN 1530 can further communicate with core network 1540 according to various protocols and interfaces described above. For example, one or more apparatus (e.g., base stations, eNBs, gNBs, etc.) comprising RAN 1530 can communicate to core network 1540 via core network interface 1550 described above. In some exemplary embodiments, RAN 1530 and core network 1540 can be configured and/or arranged as shown in other figures discussed above. For example, eNBs comprising an E-UTRAN 1530 can communicate with an EPC core network 1540 via an S1 interface, such as illustrated in FIG. 1. As another example, gNBs comprising a NR RAN 1530 can communicate with a 5GC core network 1530 via an NG interface, such as illustrated in FIGS. 3-4.

Core network 1540 can further communicate with an external packet data network, illustrated in FIG. 15 as Internet 1550, according to various protocols and interfaces known to persons of ordinary skill in the art. Many other devices and/or networks can also connect to and communicate via Internet 1550, such as exemplary host computer 1560. In some exemplary embodiments, host computer 1560 can communicate with UE 1510 using Internet 1550, core network 1540, and RAN 1530 as intermediaries. Host computer 1560 can be a server (e.g., an application server) under ownership and/or control of a service provider. Host computer 1560 can be operated by the OTT service provider or by another entity on the service provider's behalf.

For example, host computer 1560 can provide an over-the-top (OTT) packet data service to UE 1510 using facilities of core network 1540 and RAN 1530, which can be unaware of the routing of an outgoing/incoming communication to/from host computer 1560. Similarly, host computer 1560 can be unaware of routing of a transmission from the host computer to the UE, e.g., the routing of the transmission through RAN 1530. Various OTT services can be provided using the exemplary configuration shown in FIG. 15 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 15 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for operation in unlicensed spectrum, particularly to indicate, assign, and/or configure time resources for UEs —such as UE 1510—to transmit on an UL shared channel in unlicensed spectrum. For example, by facilitating flexible selection between pending and new data after an LBT failure, such techniques can improve flexibility for handling configured UL resources, and can better satisfy QoS requirements of various services that share the same configured UL resource. When used in NR UEs (e.g., UE 1510) and gNBs (e.g., gNBs comprising RAN 1530), exemplary embodiments described herein can provide various improvements, benefits, and/or advantages that facilitate the use of unlicensed spectrum in addition to licensed spectrum. Using additional spectrum resources to provide services improves the performance of these services as experienced by OTT service providers and end-users, including more consistent data throughout and fewer delays without excessive UE power consumption or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The techniques and apparatus described herein include, but are not limited to, the following enumerated examples:

E1. A method, performed by a user equipment (UE), for autonomous uplink (UL) transmission on a shared channel within a cell of a radio access network (RAN), the method comprising:

receiving, from a network node serving the cell, a configuration of resources for transmitting information on the shared channel, wherein the configuration indicates a plurality of timeslots during which transmission by the UE is permitted on the shared channel;

preparing a first transport block (TB) of data for UL transmission;

based on performing a listen-before-talk (LBT) procedure, determining that the shared channel is unavailable for transmitting the first TB during a first one of the timeslots;

receiving further data for UL transmission after the first timeslot but before a second one of the timeslots; and determining whether the first TB or the further data should be prioritized for UL transmission during the second timeslot.

E2. The method of example E1, wherein determining whether the first TB or the further data should be prioritized is based on one or more of the following:

logical channel priorities associated with the first TB and with the further data;

service types associated with the first TB and with the further data; quality of service (QoS) requirements associated with the first TB and with the further data;

an amount of time that the data of the first TB has been queued by the UE; and a predetermined rule prioritizing any data received before the first timeslot or any data received after determining that the shared channel is unavailable during the first timeslot.

E3. The method of any of examples E1-E2, wherein determining whether the first TB or the further data should be prioritized comprises determining that the further data should be prioritized based on an amount of time that the data of the first TB has been queued by the UE being one of the following:

less than or equal to a first threshold, such that the first TB will meet its associated QoS requirements even if the further data is prioritized; or greater than a second threshold, such that the first TB will not meet its associated QoS requirements even if it is prioritized.

E4. The method of any of examples E1-E3, wherein determining whether the first TB or the further data should be prioritized comprises determining that the first TB should be prioritized based on an amount of time that the data of the first TB has been queued by the UE being higher than a third threshold, such that the first TB must be prioritized to meet its QoS requirements.

E5. The method of any of examples E1-E4, wherein determining whether the first TB or the further data should be prioritized comprises determining that the first TB should be prioritized if the further data was received less than a predetermined duration before the second timeslot.

E6. The method of any of examples E1-E5, wherein:

preparing the first TB comprises storing the first TB in a first one of a plurality of hybrid ARQ (HARQ) buffers; and determining whether the first TB or the further data should be prioritized comprises determining that the first TB should be prioritized if all of the HARQ buffers contain TBs awaiting retransmission.

E7. The method of example E6, further comprising:
preparing the further data as a second TB, including storing the second TB in a second one of the HARQ buffers; and
selectively transmitting, on the shared channel during the second timeslot, from the first HARQ buffer or the second HARQ buffer based on determining whether the first TB or the further data should be prioritized.

E8. A user equipment (UE) configured for autonomous uplink (UL) transmission on a shared channel within a cell of a radio access network (RAN), the UE comprising:
transceiver circuitry configured to communicate with a network node serving the cell; and
processing circuitry operatively coupled to the transceiver circuitry, whereby the processing circuitry and the transceiver circuitry are configured to perform operations corresponding to any of the methods of examples E1-E7.

E9. A user equipment (UE) configured for autonomous uplink (UL) transmission on a shared channel within a cell of a radio access network (RAN), the UE being further arranged to perform operations corresponding to any of the methods of examples E1-E7.

E10. A non-transitory, computer-readable medium storing computer-executable instructions that, when executed by processing circuitry of a user equipment (UE), configure the UE to perform operations corresponding to any of the methods of examples E1-E7.

E11. A computer program product comprising computer-executable instructions that, when executed by processing circuitry of a user equipment (UE), configure the UE to perform operations corresponding to any of the methods of examples E1-E7.

The invention claimed is:

1. A method, performed by a user equipment, UE, for uplink, UL, transmission on a shared channel in a cell of a radio access network, RAN, the method comprising:
receiving, by the UE from a serving network node in the RAN, at least one rule via at least one downlink transmission message, wherein the at least one rule is configured on the UE by the serving network node as a configured rule;
determining that the shared channel is unavailable for UL transmission of pending data during a first transmission opportunity;
determining that further data for UL transmission is available before a second transmission opportunity that is after the first transmission opportunity; and
determining based on the configured rule whether the pending data or the further data should be prioritized for UL transmission during the second transmission opportunity.

2. The method of claim 1, wherein the determining that the further data is available before the second transmission opportunity comprises determining that the further data is available after the first transmission opportunity.

3. The method of claim 1, wherein:
the method further comprising receiving, from a network node serving the cell, a configured UL grant of resources associated with the shared channel;
the configured UL grant is applicable for a plurality of transmission opportunities during which UL transmission by the UE is permitted on the shared channel; and
the plurality of transmission opportunities includes the first and second transmission opportunities.

4. The method of claim 1, wherein the determining whether the pending data or the further data should be prioritized is based on one or more of the following:
logical channel priorities associated with the pending data and with the further data;
service types associated with the pending data and with the further data;
quality of service, QOS, requirements associated with the pending data and with the further data;
an amount of time that the pending data has been queued by the UE;
a predetermined rule prioritizing data pending before a listen-before-talk, LBT, determination that the shared channel is unavailable; and
a predetermined rule prioritizing data received after an LBT determination that the shared channel is unavailable.

5. The method of claim 1, wherein the determining whether the pending data or the further data should be prioritized comprises determining that the further data should be prioritized based on an amount of time that the pending data has been queued by the UE being one or more of the following:
less than or equal to a first threshold, such that the pending data will meet its associated QOS requirements in the event the further data is prioritized; and
greater than a second threshold, such that the pending data will not meet its associated QoS requirements in the event the pending data is prioritized.

6. The method of claim 1, wherein the determining whether the pending data or the further data should be prioritized comprises determining that the pending data should be prioritized based on an amount of time that the pending data has been queued by the UE being greater than a third threshold, such that the pending data must be prioritized to meet its associated QoS requirements.

7. The method of claim 1, wherein:
the determining whether the pending data or the further data should be prioritized comprises determining whether the further data is received less than a predetermined duration before the second transmission opportunity; and
the predetermined duration is associated with an amount of time needed by the UE to prepare a transport block containing the further data.

8. The method of claim 7, wherein when the further data is received less than the predetermined duration before the second transmission opportunity, the pending data is prioritized regardless of other reasons for prioritizing the further data.

9. The method of claim 1, wherein the determining whether the pending data or the further data should be prioritized comprises determining availability of any hybrid ARQ, HARQ, buffer that does not contain data awaiting retransmission, for storing the further data for UL transmission.

10. The method of claim 9, wherein when no HARQ buffers that do not contain data awaiting retransmission are determined to be available, the pending data is prioritized regardless of other reasons for prioritizing the further data.

11. The method of claim 1, further comprising:
storing the pending data as a first transport block, TB, in a first hybrid ARQ, HARQ, buffer; and
storing the further data as a second TB in a second HARQ buffer.

12. The method of claim 11, wherein the second HARQ buffer is associated with a different HARQ process than the first HARQ buffer.

13. The method of claim 11, wherein:
the second HARQ buffer is the first HARQ buffer; and
the method further comprises, based on the determination of prioritization, selectively reordering the first TB and the second TB in the first HARQ buffer.

14. The method of claim 1, wherein:
the determining that the shared channel is unavailable comprises performing a listen-before-talk, LBT, procedure on the shared channel; and
the pending data is pending due a previous determination, by a previous LBT procedure, that the shared channel was unavailable for UL transmission during a previous transmission opportunity before the first transmission opportunity.

15. The method of claim 1, further comprising, based on the determination of prioritization, transmitting the pending data or the further data during the second transmission opportunity.

16. The method of claim 15, wherein the transmitting the pending data or the further data is further based on determining that the shared channel is available for UL transmission during the second transmission opportunity.

17. A user equipment, UE configured for uplink, UL, transmission on a shared channel in a cell of a radio access network, RAN, the UE comprising:
radio transceiver circuitry configured to communicate with the RAN via the cell; and
processing circuitry operably coupled to the radio transceiver circuitry, whereby the processing circuitry and the radio interface circuitry are configured to:
receive, from a serving network node in the RAN, at least one rule via at least one downlink transmission message, wherein the at least one rule is configured on the UE by the serving network node as a configured rule;
determine that the shared channel is unavailable for UL transmission of pending data during a first transmission opportunity;
determine that further data for UL transmission is available before a second transmission opportunity that is after the first transmission opportunity; and
determine based on the configured rule whether the pending data or the further data should be prioritized for UL transmission during the second transmission opportunity.

18. The UE of claim 17, wherein the processing circuitry and the radio interface circuitry are further configured to perform operations wherein the determine that the further data is available before the second transmission opportunity comprises determine that the further data is available after the first transmission opportunity.

19. A non-transitory, computer-readable medium storing program instructions that, when executed by processing circuitry of a user equipment, UE configured for uplink, UL, transmission on a shared channel in a cell of a radio access network, RAN, configure the UE to:
receive, from a serving network node in the RAN, at least one rule via at least one downlink transmission message, wherein the at least one rule is configured on the UE by the serving network node as a configured rule;
determine that the shared channel is unavailable for UL transmission of pending data during a first transmission opportunity;
determine that further data for UL transmission is available before a second transmission opportunity that is after the first transmission opportunity; and
determine based on the configured rule whether the pending data or the further data should be prioritized for UL transmission during the second transmission opportunity.

20. The non-transitory, computer-readable medium of claim 19, further storing program instructions that, when executed by the processing circuitry, configure the UE to perform operations wherein the determine that the further data is available before the second transmission opportunity comprises determine that the further data is available after the first transmission opportunity.

* * * * *